US012394882B2

(12) United States Patent
Goden et al.

(10) Patent No.: US 12,394,882 B2
(45) Date of Patent: Aug. 19, 2025

(54) ANTENNA DEVICE AND CAMERA SYSTEM

(71) Applicant: CANON KABUSHIKI KAISHA, Tokyo (JP)

(72) Inventors: Tatsuhito Goden, Tokyo (JP); Yasushi Koyama, Kanagawa (JP); Noriyuki Kaifu, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 99 days.

(21) Appl. No.: 18/359,187

(22) Filed: Jul. 26, 2023

(65) Prior Publication Data

US 2023/0378637 A1 Nov. 23, 2023

Related U.S. Application Data

(63) Continuation of application No. PCT/JP2021/047654, filed on Dec. 22, 2021.

(30) Foreign Application Priority Data

Feb. 3, 2021 (JP) ................................. 2021-015981
Dec. 9, 2021 (JP) ................................. 2021-199839

(51) Int. Cl.
*H01Q 1/22* (2006.01)
*H01Q 21/06* (2006.01)
*H01Q 23/00* (2006.01)

(52) U.S. Cl.
CPC ......... *H01Q 1/2283* (2013.01); *H01Q 21/061* (2013.01); *H01Q 23/00* (2013.01)

(58) Field of Classification Search
CPC .... H01Q 1/2283; H01Q 21/061; H01Q 23/00; H01Q 1/52; H01Q 21/065
See application file for complete search history.

(56) References Cited

U.S. PATENT DOCUMENTS 7,924,107 B2 4/2011 Koyama
9,184,697 B2 11/2015 Sekiguchi
(Continued)

FOREIGN PATENT DOCUMENTS

JP 2014-200065 A 10/2014
JP 2015-180047 A 10/2015
(Continued)

OTHER PUBLICATIONS

International Search Report issued Mar. 1, 2022 in corresponding PCT Application No. PCT/JP2021/047654(English translation included).
(Continued)

*Primary Examiner* — Seung H Lee
(74) *Attorney, Agent, or Firm* — VENABLE LLP

(57) ABSTRACT

An antenna device includes an antenna array in which a plurality of antennas each including a negative differential resistance element and a resonance circuit are arranged, a voltage bias circuit which applies a voltage to the antenna array, a first shunt element which is connected between the antenna array and the voltage bias circuit in parallel relation to each of the negative differential resistance element and the voltage bias circuit, and in which a first resistor and a first capacitor of the first shunt element are connected in series, and a second shunt element which is connected between the first shunt element and the voltage bias circuit in parallel relation to each of the negative differential resistance element and the voltage bias circuit, and in which a second resistor and a second capacitor of the second shunt element are connected in series.

30 Claims, 23 Drawing Sheets

(56) References Cited

U.S. PATENT DOCUMENTS

| | | | | |
|---|---|---|---|---|
| 9,391,428 | B2 | 7/2016 | Koyama | |
| 9,899,959 | B2 | 2/2018 | Feiginov | |
| 11,025,199 | B2 | 6/2021 | Kandori | |
| 11,283,406 | B2 | 3/2022 | Kandori | |
| 11,451,193 | B2 | 9/2022 | Kandori | |
| 11,626,839 | B2 * | 4/2023 | Koyama | H01Q 9/0457 343/720 |
| 11,637,530 | B2 * | 4/2023 | Fujimoto | H04B 1/18 331/107 T |
| 11,770,102 | B2 | 9/2023 | Kandori | |
| 2014/0266477 | A1 | 9/2014 | Sekiguchi | |
| 2020/0266762 | A1 | 8/2020 | Kandori | |
| 2022/0173515 | A1 | 6/2022 | Koyama | |
| 2022/0317331 | A1 | 10/2022 | Goden | |
| 2023/0110775 | A1 | 4/2023 | Numata | |
| 2023/0207500 | A1 | 6/2023 | Koyama | |
| 2023/0208359 | A1 | 6/2023 | Koyama | |
| 2023/0258793 | A1 | 8/2023 | Itsuji | |
| 2023/0262312 | A1 | 8/2023 | Koyama | |
| 2023/0335885 | A1 | 10/2023 | Yukimasa | |
| 2023/0335898 | A1 | 10/2023 | Koyama | |

FOREIGN PATENT DOCUMENTS

| | | | |
|---|---|---|---|
| JP | 2015-180049 | A | 10/2015 |
| JP | 2020-57739 | A | 4/2020 |
| JP | 2020-136910 | A | 8/2020 |

OTHER PUBLICATIONS

U.S. Appl. No. 18/474,264, filed Sep. 26, 2023 by Yasushi Koyama.

Structure-Simplified Resonant-Tunneling-Diode Teraherz Oscillator Without Metal-Insulator-Metal Capacitors, Journal of Infrared, Millimeter, and Terahertz Waves (2020) 41:1498-1507, published on Aug. 29, 2020, by Ta Van Mai et al.

High-Efficiency Bias Stabilization for Resonant Tunneling Diode Oscillators, IEEE Transactions on Microwave Theory and Techniques, vol. 67, No. 8, pp. 3449-3454, published Aug. 2019, by Andrei Catalin Cornescu, et al.

Japanese Office Action issued Jun. 3, 2025 during prosecution of related Japanese Application No. 2021-199839. (English-language machine translation included).

* cited by examiner

ANTENNA DEVICE AND CAMERA SYSTEM

CROSS-REFERENCE TO RELATED APPLICATIONS

This application is a Continuation of International Patent Application No. PCT/JP2021/047654, filed on Dec. 22, 2021, which claims the benefit of Japanese Patent Applications No. 2021-015981, filed on Feb. 3, 2021 and Japanese Patent Application No. 2021-199839, filed on Dec. 9, 2021, which are hereby incorporated by reference herein in their entirety.

BACKGROUND OF THE INVENTION

Field of the Invention

The present disclosure relates to an antenna device that transmits or receives an electromagnetic wave and to a camera system.

Description of the Related Art

An antenna including a negative differential resistance element and a resonance circuit can generate an electromagnetic wave (hereinafter referred to simply as the "terahertz wave") including at least a part of a frequency band from a millimeter wave to a terahertz wave (at least 30 GHz and not more than 30 THz). By way of example, PTL 1 discloses an antenna having a negative differential resistance element and a resonance circuit each integrated in a semiconductor chip to generate the terahertz wave.

In PTL 1, as the negative differential resistance element, a resonant tunneling diode (RTD) is used, and a power source that supplies a bias voltage to the negative differential resistance element is included. The bias voltage from the power source is supplied to the negative resistance element via a bias supply unit including wiring and a conductor. Parasitic low-frequency oscillation (parasitic oscillation) other than the terahertz wave generated from an antenna is often generated by a structure accompanying the bias supply unit. Therefore, PTL 1 discloses a technology of placing a shunt element in the bias supply unit and thereby suppressing the parasitic oscillation.

CITATION LIST

Patent Literature

PTL 1 Japanese Patent Application Publication No. 2015-180049

As a means for enhancing an antenna output, there is aa approach in which a plurality of antennas each including a negative differential resistance element and a resonance circuit are arranged to provide an antenna array. In a case of mounting a chip integrated with this antenna array on another substrate such as a ceramic package or a printed substrate, the chip and the substrate are connected using bonding wires, and a shunt element for suppressing the parasitic oscillation is placed on the substrate.

Each of the bonding wires and a resistor and a capacitor each included in the shunt element has a parasitic inductance. The parasitic inductance cannot be ignored in terms of normally generating the terahertz wave, and causes the parasitic oscillation at a frequency (less than 30 GHz) lower than that of the terahertz wave. Due to the parasitic inductance, the parasitic oscillation particularly at 10 MHz to 10 GHz is likely to occur. In such an antenna array, to normally oscillate the terahertz wave, it is necessary to optimize circuit parameters and the placement of the shunt element on the substrate but, in PTL 1, sufficient examination has not been conducted.

It is therefore an object of the present disclosure is to provide a technology of suppressing parasitic oscillation in an antenna device having an antenna array including negative differential resistance elements and resonance circuits.

SUMMARY OF THE INVENTION

For the above object, an antenna device of the present disclosure includes an n antenna device transmitting or receiving an electromagnetic wave, the antenna device including an antenna array in which a plurality of antennas each including a negative differential resistance element and a resonance circuit are arranged, a voltage bias circuit which applies a voltage to the antenna array, a first shunt element which is connected between the antenna array and the voltage bias circuit in parallel relation to each of the negative differential resistance element and the voltage bias circuit, and in which a first resistor and a first capacitor of the first shunt element are connected in series, and a second shunt element which is connected between the first shunt element and the voltage bias circuit in parallel relation to each of the negative differential resistance element and the voltage bias circuit, and in which a second resistor and a second capacitor of the second shunt element are connected in series, wherein each of the first shunt element and the second shunt element has a low impedance with respect to a resistance value of the negative differential resistance element used as a reference.

In addition, an antenna of the present disclosure includes an antenna device transmitting or receiving an electromagnetic wave, the antenna device including a chip having an antenna array in which a plurality of antennas each including a negative differential resistance element and a resonance circuit are arranged, a substrate on which the chip is to be placed, and a voltage bias circuit that applies a voltage to the antenna array, wherein the chip has a first shunt element connected in parallel to each of the negative differential resistance element and the voltage bias circuit and including at least a first capacitor, and a plurality of pads including at least each of a first pad and a second pad to supply a predetermined voltage to the antenna array, the substrate has a second shunt element connected in parallel to each of the negative differential resistance element and the voltage bias circuit, and including at least a second capacitor, and moreover placed in the substrate, and wherein the antenna array is located between the first pad and the second pad. Further, a camera system of the present disclosure includes a camera system including the antenna device as described above, a detection device for detecting the electromagnetic wave transmitted from the antenna device, and a processing unit that processes a signal from the detection device.

Further features of the present invention will become apparent from the following description of exemplary embodiments with reference to the attached drawings.

DESCRIPTION OF THE EMBODIMENTS

Figure 1:
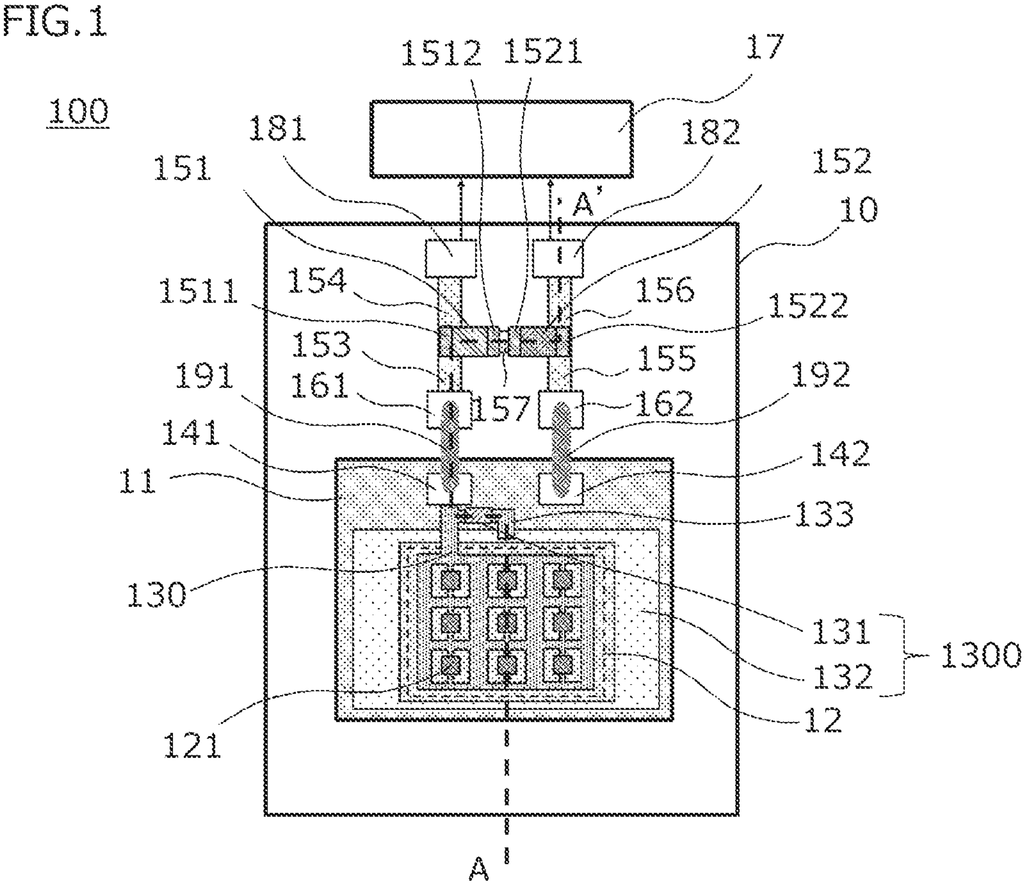
FIG. 1 illustrates an example of a plan view of an antenna device according to a first embodiment.

Using the drawings, a description will be given below of embodiments of the present disclosure. Note that the present disclosure is not limited to the following embodiments, and can appropriately be modified within a scope not departing from the gist thereof. In addition, in the drawings described below, components having the same functions are denoted by the same reference signs, and a description thereof may be omitted or simplified.

First Embodiment

Figure 2:
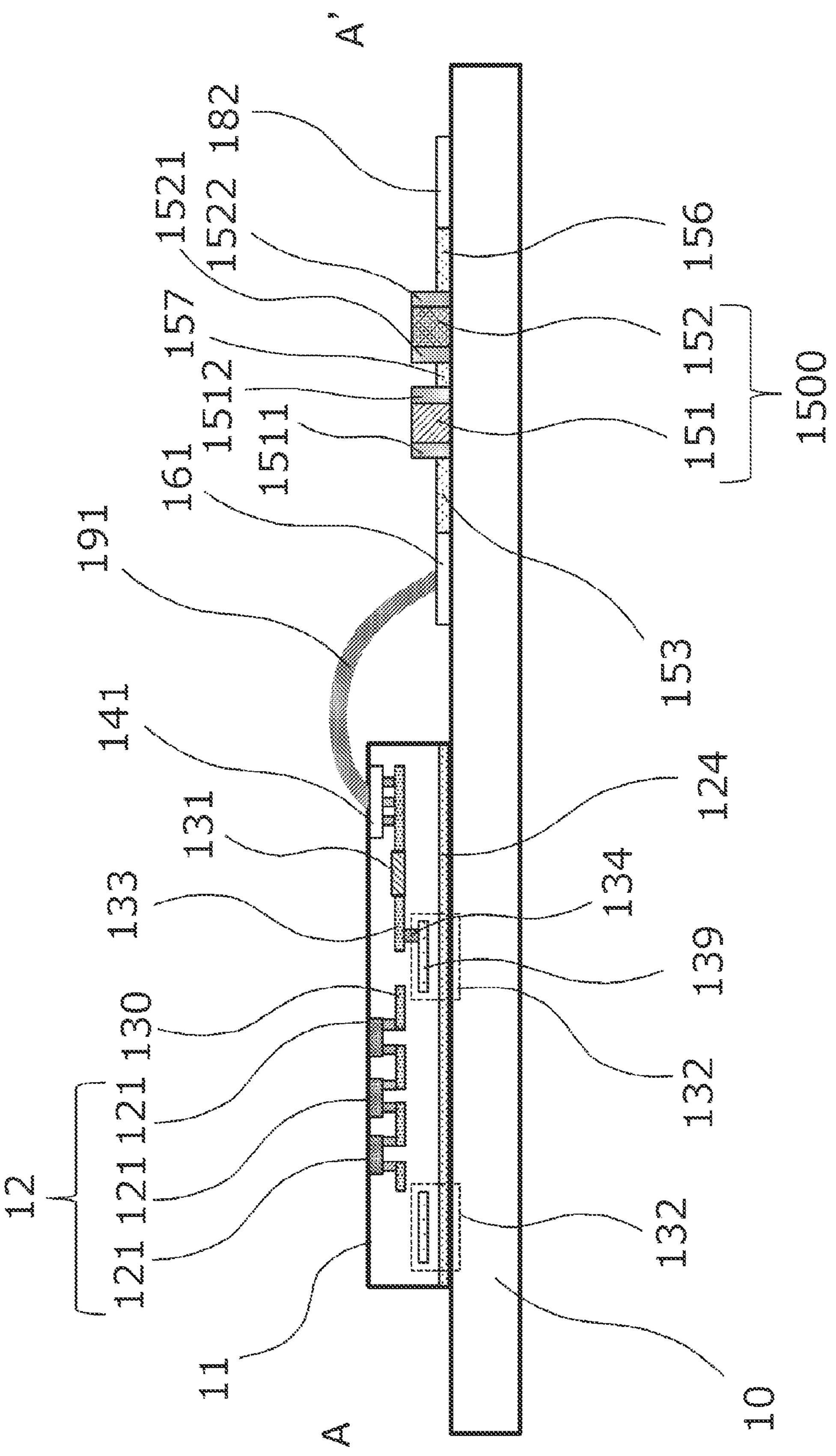
FIG. 2 illustrates an example of a cross-sectional view of the antenna device according to the first embodiment.

Using FIGS. 1 to 9, a description will be given of an antenna device according to the first embodiment. FIG. 1 is a plan view illustrating a schematic configuration of the antenna device according to the present embodiment. FIG. 2 is a cross-sectional view along a line A-A' in FIG. 1.

As illustrated in FIGS. 1 and 2, in an antenna device 100 according to the present embodiment, a chip 11 having a quadrilateral shape on which an antenna array 12 including a plurality of antennas 121 are arranged is mounted on a substrate 10. FIG. 1 illustrates a configuration on a top surface of the chip 11. Each of the antennas 121 includes a negative differential resistance element and a resonance circuit, and transmits or receives an electromagnetic wave in a terahertz frequency band, though details of the antenna 121 will be described later. The antenna 121 generates an electromagnetic wave (hereinafter referred to simply as a "terahertz wave") including a frequency band corresponding to at least a part of a frequency band (at least 30 GHz and not more than 30 THz) from a millimeter wave to the terahertz wave. In addition, the adjacent antennas 121 are configured to be capacitively coupled via a microstrip line (described later using FIG. 4).

The chip 11 includes, in addition to the antenna array 12, a resistance element 131 and a capacitance element 132 each included in a first shunt element 1300, a pad 141 that applies a bias voltage to the chip 11, and a pad 142 that applies a ground voltage to the chip 11. The pads 141 and 142 are for achieving an electrical connection to a circuit outside the chip 11 and for, e.g., supplying a predetermined voltage from the outside. The pads 141 and 142 are made of a conductor. Hereinbelow, the pads are for electrical connection to the outside. Specifically, the pads may be for a supply of a predetermined voltage from the outside and for a supply of the predetermined voltage to the outside. In the present embodiment, the predetermined voltage may be the ground voltage, a power source voltage, a voltage from a voltage bias circuit, or the like.

The antenna array 12 is placed substantially at a center of the chip 11, and the capacitance element 132 is placed adjacent to the antenna array 12. Such placement of the capacitance element 132 as to surround the antenna array 12 can also enlarge an area of the capacitance element placed on the chip 11 and ensure a large capacitance. The capacitance element 132 is also divided to be arranged on respective sides (a right side and a left side of the chip 11 in the figure) with two facing sides of the chip 11 such that the antenna array 12 is interposed therebetween. This allows the resistance element 131, wiring, the pads, and the like to be placed in a portion (upper side of the chip 11 in the figure) where the capacitance element 132 is not placed, and can thereby reduce a chip size of the chip 11.

As illustrated in FIG. 2, one terminal of the resistance element 131 is connected to one terminal of the capacitance element 132 via each of wiring 133 and a via 134. The resistance element 131 and the capacitance element 132 are connected in series and, for easy placement of the connection, the resistance element 131 is preferably placed in the vicinity of the capacitance element 132. Alternatively, the resistance element 131 may also be placed on the capacitance element 132 in overlapping relation thereto. Another terminal of the resistance element 131 is connected to the pad 141 via a bias voltage line 130. The bias voltage line 130 is placed between the individual antennas 121 in the antenna array 12 to be connected commonly to the individual antennas 121 and apply the bias voltage to each of the antennas 121. Another terminal of the capacitance element 132 is connected to the pad 142 via wiring and a via (not shown).

As the capacitance element 132, a MIM (Metal-Insulator-Metal) capacitor in which an insulating layer is interposed between metal layers can be used. As the metal layers, wiring layers in the chip 11 can be used while, as the insulating layer, an insulating layer and a dielectric layer each forming the antennas can be used. According to the present embodiment, as illustrated in FIG. 2, as one electrode of the MIM capacitor, a grounded metal layer 124 is used, and the grounded metal layer 124 is connected to the pad 142 that applies the ground voltage. As another electrode of the MIM capacitor, a metal layer 139 is formed via the insulating layer. The metal layer 139 is connected to the wiring 133 via the via 134. By thus configuring the MIM capacitor, it is possible to form the capacitor in the chip by a simple and convenient manufacturing process.

In addition to the configuration described above, a configuration in which a capacitor is formed on a substrate other than that of the chip 11 to be bonded to the top surface or a back surface of the chip 11 is also possible, and this configuration allows a larger-capacitance capacitance element to be included.

In the first shunt element 1300, the resistance element 131 is connected to the pad 141 that applies the bias voltage, while the capacitance element 132 is connected to the pad 142 that applies the ground voltage. However, it may also be possible to invert a connection relationship and connect the resistance element 131 to the pad 142 that applies the ground voltage, while connecting the capacitance element 132 to the pad 141 that applies the bias voltage.

Preferably, on the chip 11, as the antennas 121 in the antenna array 12, 20 to 40 antennas are arranged. In addition, the number of the pads 141 for the application of the bias voltage and the number of the pads 142 that apply the ground voltage are set smaller than the number of the antennas. This allows a space of the chip 11 to be effectively used and allows a further size reduction of the chip 11. Moreover, when the number of pairs of the resistance elements 131 and the capacitance elements 132 is not more than the number of the pads 141 for the application of the bias voltage or not more than the number of the pads 142 that apply the ground voltage, it is possible to effectively use the space of the chip 11 and allow a further size reduction of the chip 11.

The substrate 10 includes a resistance element 151 and a capacitance element 152 each included in a second shunt element 1500, a pad 161 to be connected to the pad 141 of the chip 11, and a pad 162 to be connected to the pad 142 of the chip 11. The pads 161 and 162 are for achieving electric connection to an external circuit outside the chip 11. The pads 161 and 162 are made of a conductor. The external circuit mentioned herein is the chip 11. The substrate 10 also includes a connection terminal 181 to which the bias voltage is to be supplied from the voltage bias circuit 17 and a connection terminal 182 that gives the ground voltage. For a size reduction of the substrate 10, it is preferable to use a surface mount component (SMD: Surface Mount Device) as the resistance element 151 or the capacitance element 152. Since wiring to be placed in the substrate 10 also has a resistance value, as the resistance element 151, a resistance of wiring in the substrate 10 included in a path connecting the first shunt element 1300 and the second shunt element 1500 may also be used. This can reduce the number of components used in the chip 11 and achieve a size reduction of the chip 11. The connection terminals 181 and 182 may also be pads herein.

The voltage bias circuit 17 is connected from the outside of the substrate 10 via the connection terminals 181 and 182. Note that, instead of using this configuration, it may also be possible to place the voltage bias circuit 17 in the substrate 10 or in the chip 11.

The pad 141 of the chip 11 and the pad 161 of the substrate 10 are connected with a bonding wire 191. The pad 142 of the chip 11 and the pad 162 of the substrate 10 are connected with a bonding wire 192. To reduce inductances of the bonding wires 191 and 192, it is preferable to arrange the pad 141 and the pad 161 as well as the pad 142 and the pad 162 close to each other and reduce lengths of the bonding wires 191 and 192.

To shorten the bonding wires 191 and 192, the pad 141 and the pad 142 are arranged appropriately on an end portion of the chip 11. Meanwhile, the pad 141 and the pad 161 are arranged appropriately to face each other with the side of the chip 11 being interposed therebetween. In addition, the pad 142 and the pad 162 are also arranged appropriately to face each other with the side of the chip 11 being interposed therebetween.

One terminal 1512 of the resistance element 151 is connected to one terminal 1521 of the capacitance element 152 via wiring 157. In other words, the resistance element 151 and the capacitance element 152 are connected in series. Accordingly, the resistance element 151 and the capacitance element 152 are preferably arranged adjacent to each other. More preferably, the one terminal 1512 of the resistance element 151 is placed adjacent to the one terminal 1521 of the capacitance element 152. This can reduce a length of the wiring 157 and reduce the inductance.

Another terminal 1511 of the resistance element 151 is connected to the pad 161 via wiring 153 and also connected to the connection terminal 181 via wiring 154. Another terminal 1522 of the capacitance element 152 is connected to the pad 162 via wiring 155 and also connected to the connection terminal 182 via wiring 156. It is preferable that a direction in which the terminals 1511 and 1512 of the resistance element 151 and the terminals 1521 and 1522 of the capacitance element 152 are arranged is set the same as a direction in which the pad 161 and the pad 162 are arranged. Such an arrangement can shorten the wiring to be connected and reduce the inductance.

In the second shunt element 1500, the resistance element 151 is connected to the connection terminal 181 to which the bias voltage is to be applied, while the capacitance element 132 is connected to the connection terminal 182 that applies the ground voltage. However, it may also be possible to invert a connection relationship and connect the resistance element 131 to the connection terminal 182 that applies the ground voltage and connect the capacitance element 132 to the connection terminal 181 to which the bias voltage is to be applied.

In the present embodiment, an example is assumed in which the first shunt element 1300 and the second shunt element 1500 respectively include the resistance elements 131 and 151 and the capacitance elements 132 and 152. However, each of the first shunt element and the second shunt element may also be configured to include either one of the resistance element and the capacitance element. In a case where the shunt element includes the capacitance element, it becomes possible not only to suppress capacitive oscillation, but also reduce power consumption by using a frequency characteristic of the impedance to cut a dc current.

Positional relationships among the components of the antenna device 100 are such that, between the antenna array 12 and the voltage bias circuit 17, the first hunt element 1300 is placed and, between the first shunt element 1300 and the voltage bias circuit 17, the second shunt element 1500 is placed.

Figure 3:
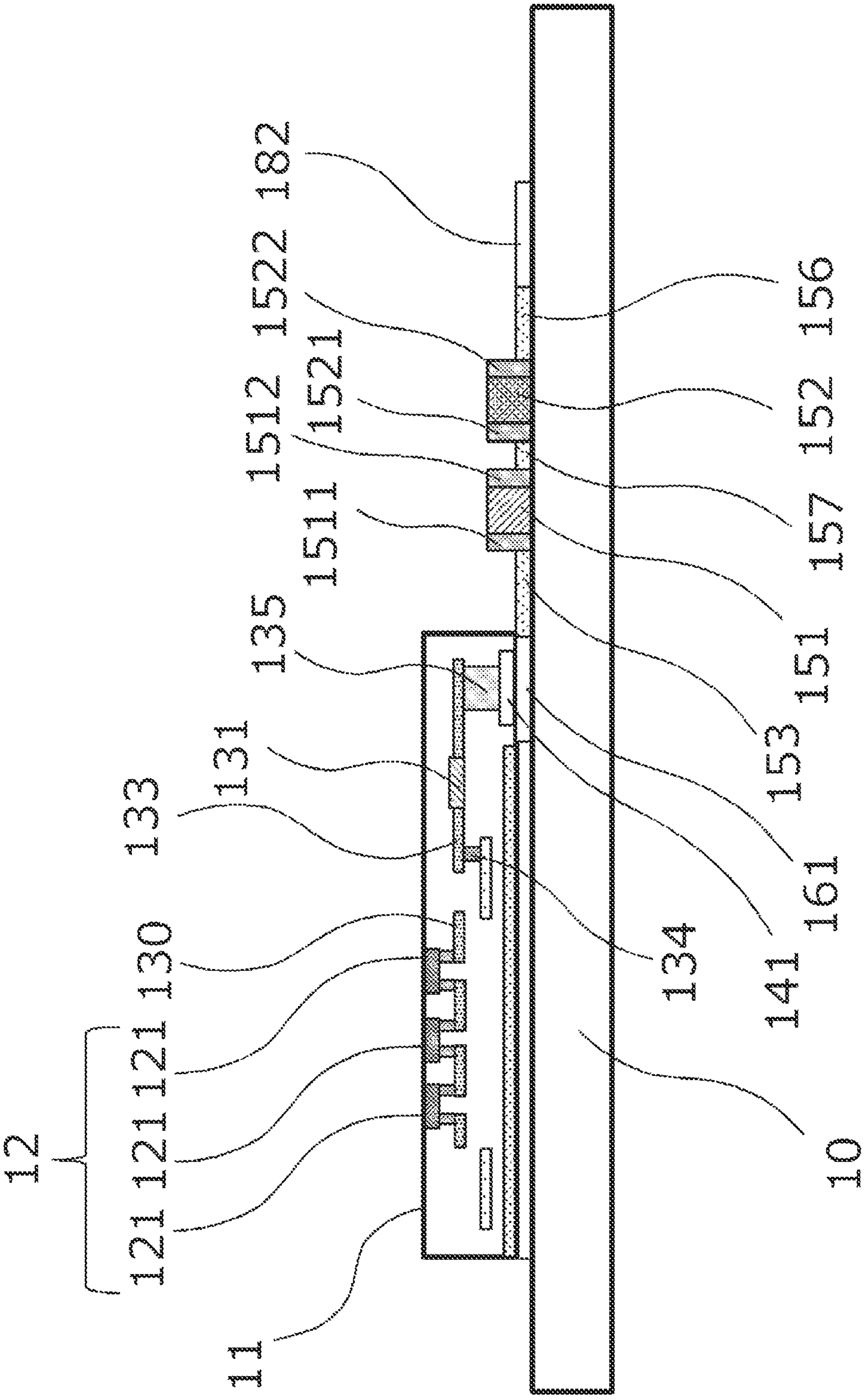
FIG. 3 illustrates an example of the cross-sectional view of the antenna device according to the first embodiment.

FIG. 3 is a partial cross-sectional view of the antenna device 100 illustrating a configuration in which the pad is formed on the back surface of the chip 11 to connect the chip 11 and the substrate 10 without using bonding wires 19. According to FIG. 3, the wiring present in the top surface of the chip 11 is connected to the pad 141 present on the back surface of the chip 11 via the through electrode 135.

The through electrode 135 is formed by forming a through hole in the chip 11, subsequently forming an insulating film for electrical isolation on an inner wall of the through hole, and filling the through hole with copper or the like, which has a low electric resistance and can easily form an electrode by an electrolytic plating method or the like. The through electrode 135 is smoothed using CMP (Chemical Mechanical Polishing) processing or the like. After the through electrode 135 is formed, the pad 141 is formed on the back surface of the chip 11 so as to be electrically connected to the through electrode 135.

The pad 141 on the back surface of the chip 11 and the pad 161 on the substrate 10 are arranged so as to overlap each other and connected by soldering or the like. In a case of providing the electrical connection using the through electrode 135, no bonding wire is used, and accordingly the inductance is reduced to easily suppress the parasitic oscillation in the antenna device 100.

Figure 4A:
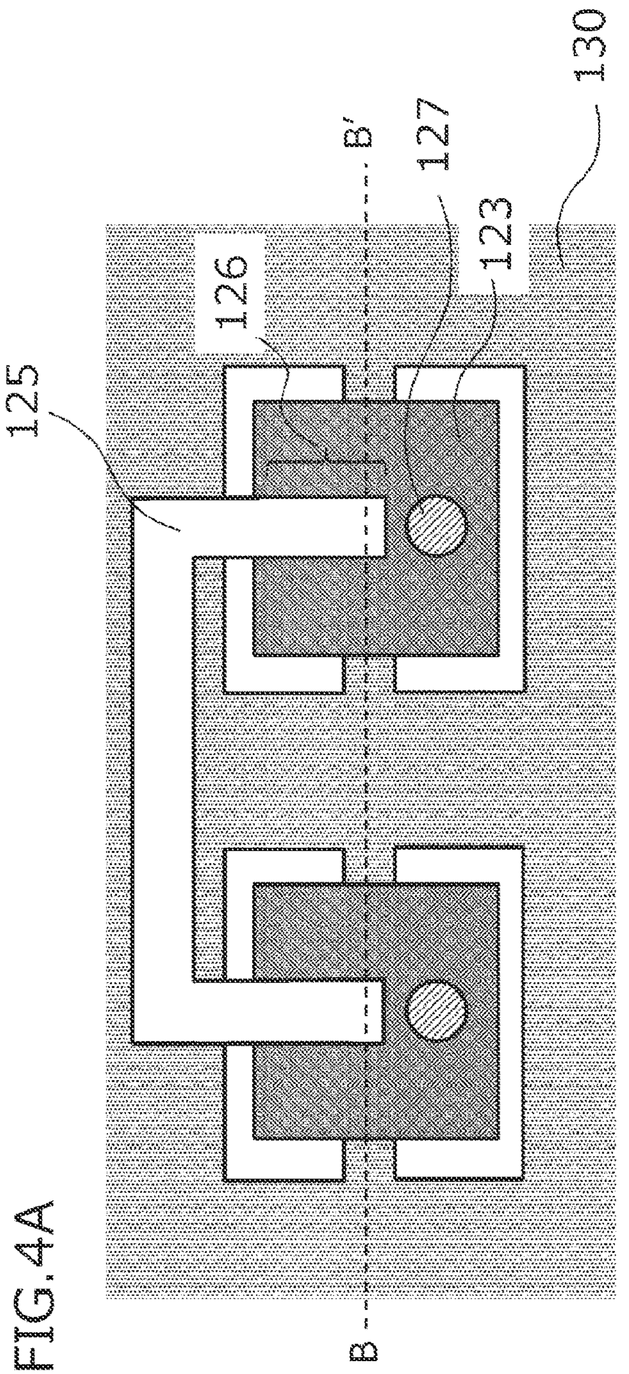
FIGS. 4A and 4B are illustrative views illustrating an antenna array according to the first embodiment.
Figure 4B:
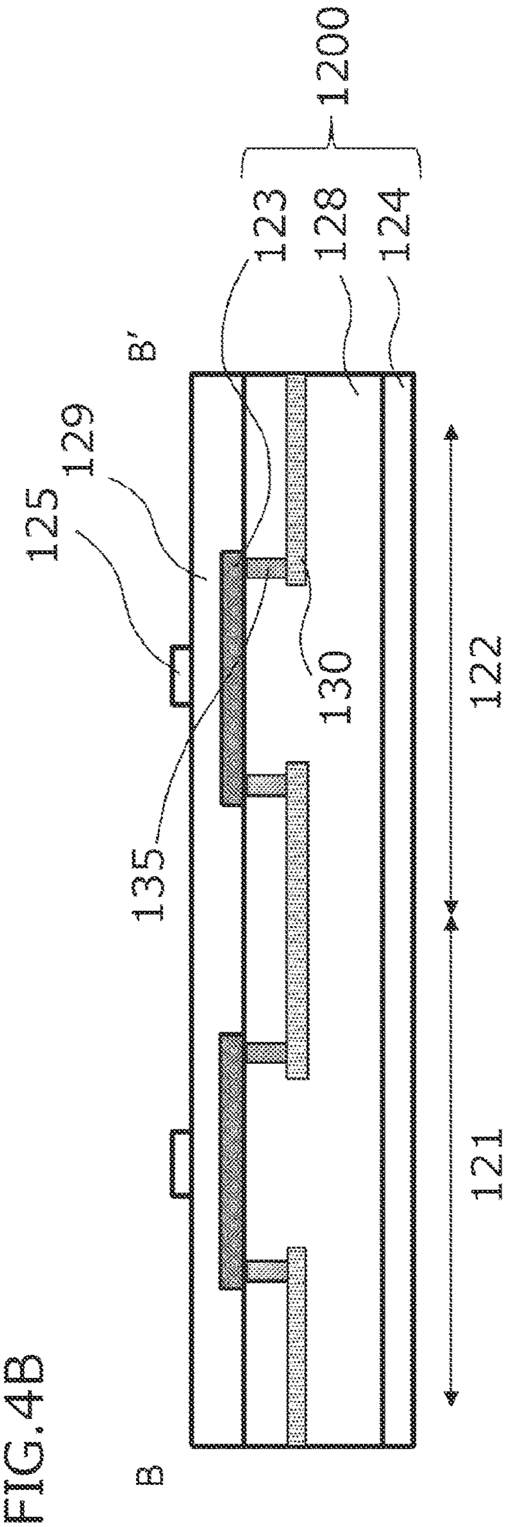

FIG. 4 are illustrative views illustrating the antenna array 12 in the present embodiment. FIG. 4A is a top view of the antenna array 12, while FIG. 4B is a cross-sectional view of the antenna array 12 along a line B-B' in FIG. 4A. In the figures, by way of example, the two antennas 121 and 122 included in the antenna array 12 are illustrated.

Normally, in an antenna array intended for power synthesis, each of intervals between individual antennas is set to a wavelength converted to a wavelength of an oscillating electromagnetic wave in vacuum or less, to an integral multiple of the wavelength, or more preferably to a half-wavelength or less. In the present embodiment, the antennas 121 and 122 are arranged such that the interval between the antennas is not more than a half-wavelength of a transmitted electromagnetic wave.

In the antenna array 12, a resonance circuit 1200 is configured to control an oscillation frequency by using a microstrip resonator including a metal layer 123 corresponding to a first conductor forming a part of each of the antennas, a dielectric layer 128, and the grounded metal layer 124 corresponding to a second conductor forming a part of each of the antennas. Each of the antennas 121 and 122 includes the resonance circuit 1200 and a negative differential resistance element 127. To the metal layer 123, the bias voltage line 130 is connected via the via 134, and the bias voltage is applied to the negative differential resistance element 127. The negative differential resistance element 127 generates an electromagnetic wave gain for maintaining oscillation. The individual antennas 121 and 122, which are synchronized in the same phase to oscillate, are designed such that a frequency close to an oscillation frequency Wo is reached. Accordingly, the individual antennas including half-wavelength resonators preferably have respective shapes similar to each other. The negative differential resistance elements 127 also preferably have respective shapes and characteristics equal to each other. A microstrip line 125 is an inter-element structure for causing individual antennas as described above to be synchronized in the same phase to oscillate.

The microstrip line 125 which is a transmission line of a metal portion serving as an ink structure has a length from one end to another end along the microstrip line 125 which is preferably chosen to be a in terms of an electric length at the oscillation frequency Wo after the synchronization. The electric length of a is a length corresponding to an effective oscillation wavelength $\lambda_0$ converted in terms of an effective dielectric constant in a surrounding structure. As the electric length, a is chosen so as to synchronize the antennas 121 and 122 in the same phase and oscillate the antennas 121 and 122. In a case of synchronizing the antennas 121 and 122 in opposite phases, the electric length may also be π or 3π. Even when the length of the microstrip line 125 is not precisely 2π, the synchronization of the antennas 121 and 122 is possible. Although depending on a magnitude of coupling between elements formed via the microstrip line 125, an electric length of about 2π±10% is typically in an allowable range. Note that the allowable range is wider than when coupling is provided without using the microstrip line 125. Note that the electric length of the microstrip line can easily be checked with an electromagnetic field simulator or the like.

A part of an oscillation output of the antenna 121 is input in substantially the same phase to the adjacent antenna 122 via the microstrip line 125. Meanwhile, a part of an oscillation output of the antenna 122 is input in substantially the same phase to the adjacent antenna 121 via the microstrip line 125. In the antenna array in the present embodiment, to implement such a mutual injection locking phenomenon between the antennas 121 and 122, the microstrip line 125 has been introduced.

The microstrip line 125 in the present embodiment is characterized by capacitive coupling with the metal layer 123 of a resonance structure. The microstrip line 125 and the metal layer 123 only form a capacitor via the insulating layer 129 in a metal-insulator-metal (MIM) region 126, and are in a DC-open-state. Accordingly, in a band of the oscillation frequency Wo, antenna-to-antenna coupling of a magnitude as large as that of direct coupling can be ensured. In addition, in a low frequency region lower than Wo, the magnitude of the coupling decreases, and therefore it is possible to ensure isolation between the antennas. The microstrip line 125 in the present embodiment having such a property is preferable. Additionally, in the frequency region lower than Wo, the microstrip line 125 having open end portions serves as a capacitive element. When viewed from the negative differential resistance element 127 on an antenna 121 side, the microstrip line 125 is the capacitive element, and the metal layer 123 of the resonance structure on an antenna 122 side is also a capacitor. As a result, in the low frequency region, there is no generation of resonance frequencies of concern. Therefore, it is possible to suppress the parasitic oscillation in the low frequency region.

With reference to FIGS. 4A and 4B, the description has been given of the two individual antennas 121 and 122 and, in the antenna array 12, the individual antennas can be arrayed by being arranged in the same configuration as that of the antennas 121 and 122. In addition, on the grounded metal layer 124, the plurality of metal layers 123 corresponding to the number of the arrays are placed via the dielectric layer 128, and the negative differential resistance elements 127 corresponding to the metal layers 123 are placed. The adjacent antennas are capacitively coupled via the microstrip lines 125. Each of the microstrip lines 125 has an electric length of about 2π. Accordingly, it becomes possible to synchronize all the negative differential resistance elements 127 in the same phase. As a result of thus arraying the antennas, not only synthesized electric power is increased, but also a sharp directionality is favorably obtained.

Note that, inside the chip 11, the plurality of metal layers 123 are connected commonly via a strip conductor (not shown) to be connected to the pad 141 to which the bias voltage is to be applied, while the grounded metal layer 124 is connected to the pad 142 inside the chip 11. With this configuration, when the voltage is applied to each of the pad 141 and the pad 142, the bias voltage is applied to the negative differential resistance elements 127.

As each of the negative differential resistance elements 127, a resonant tunneling diode that is lattice-matched to an InP substrate can be used. Note that the negative differential resistance element 127 is not limited to the resonant tunneling diode, and an Esaki diode or a Gunn diode may also be used. The resonance tunnelling diode is configured to include, e.g., a multiple quantum well structure including InGaAs/InAlAs and InGaAs/AlAs on the InP substrate and an electric contact layer including n-InGaAs. As the multiple quantum well structure, e.g., a triple-barrier structure is used. More specifically, the multiple quantum well structure is formed of a semiconductor multilayer film structure including AlAs (1.3 nm)/InGaAs (7.6 nm)/InAlAs (2.6 nm)/InGaAs (5.6 nm)/AlAs (1.3 nm). Among these layers, InGaAs is a well layer, while lattice-matched InAlAs and non-matched AlAs are barrier layers. These layers are intentionally left undoped by not performing carrier doping. Such a multiple quantum well structure is interposed between the electric contact layers including n-InGaAs at an electron density of $2\times10^{18}$ $cm^{-3}$. A current-voltage (I/V) characteristic of such a structure between the electric contact layers has a peak current density of 280 $kA/cm^2$, and a negative resistance region ranges from about 0.7 V to about 0.9 V. As a configuration of the diode, in a case of a mesa structure having a diameter of 2 μm, a peak current value of 10 mA and a negative resistance value of −20Ω are obtained. When consideration is given to a reactance resulting from a junction capacitance of the resonant tunneling diode having a diameter of 2 μm and connected to a lower part of the metal layer 123, an oscillation frequency is about 0.55 THz.

Figure 5:
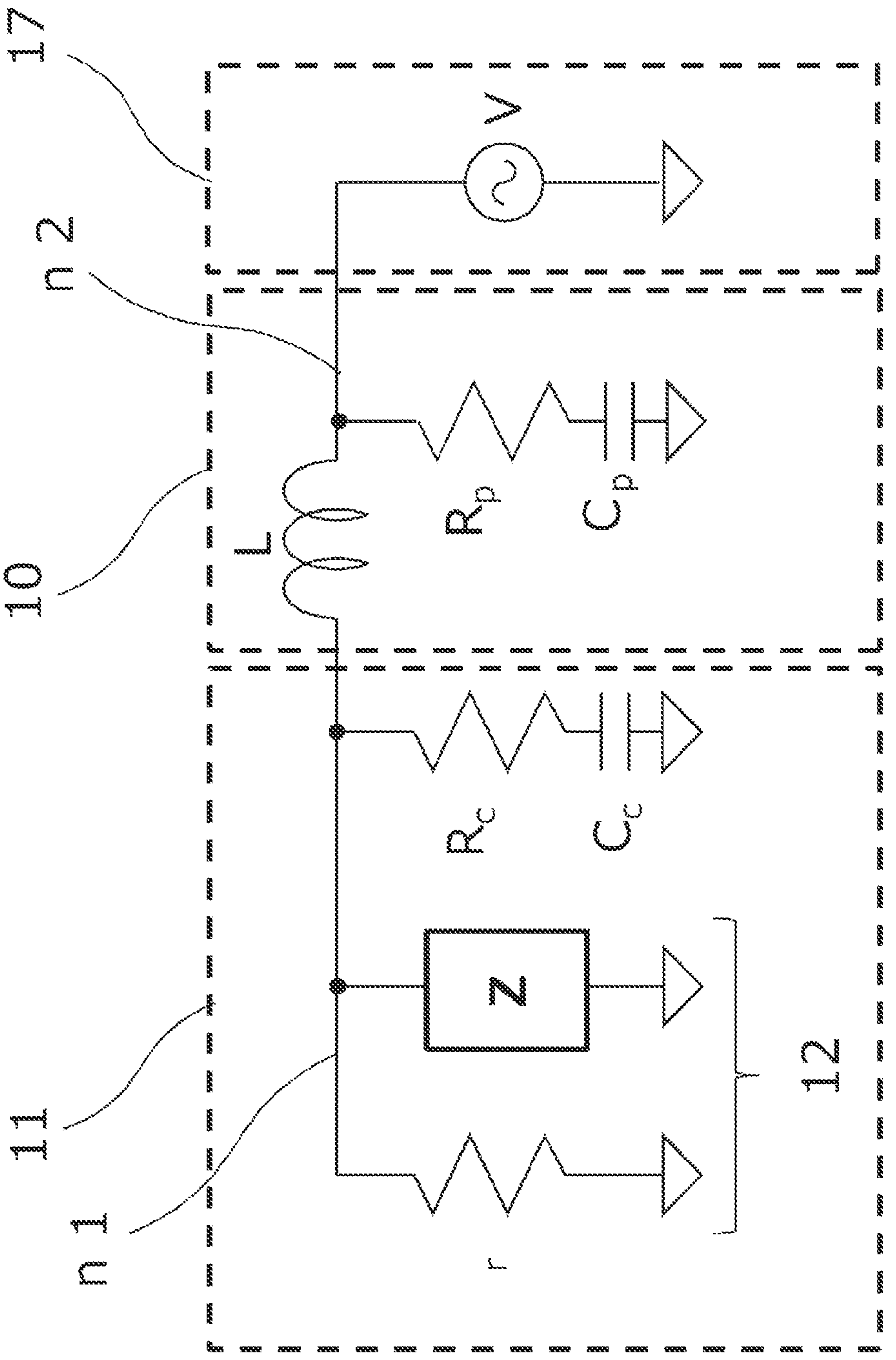
FIG. 5 is an equivalent circuit diagram of the antenna device according to the first embodiment.

Next, FIG. 5 illustrates an equivalent circuit diagram of the antenna device according to the present embodiment. An equivalent circuit of the chip 11 has a resistance r of each of the negative differential resistance elements included in the antenna array 12 (r represents an absolute value of a resistance of the negative differential resistance element). The equivalent circuit of the chip 11 also has an impedance Z of the resonance circuit 1200 included in the antenna array 12 and a resistance Rc of the resistance element 131 included in the first shunt element 1300. The equivalent circuit of the chip 11 further has a capacitance Cc of the capacitance element 132 included in the first shunt element 1300.

The first shunt element 1300 is configured to include the resistance Rc and the capacitance Cc which are connected in series. In addition, the resistance r, the impedance Z of the resonance circuit 1200, and the first shunt element 1300 are connected in parallel to each other. More specifically, one terminal of the resistance r, one terminal of the impedance Z of the resonance circuit 1200, and one terminal of the resistance Rc are each connected to a first node n1. Meanwhile, another terminal of the resistance Rc is connected to one terminal of the capacitance Cc. In addition, another terminal of the resistance r, another terminal of the impedance Z of the resonance circuit 1200, and another terminal of the capacitance Cc are connected to the ground voltage. The first node n1 is connected to the pad 141 of the chip 11, and the ground voltage is applied via the pad 142 of the chip 11.

An equivalent circuit of the substrate 10 is configured to include a resistance Rp of the resistance element 151 included in the second shunt element 1500, a capacitance Cp of the capacitance element 152 included therein, and an inductance L of the path connecting the first shunt element 1300 and the second shunt element 1500. The inductance L includes respective parasitic inductances of the wiring connecting the first shunt element 1300 and the pad 141, the bonding wires connecting the chip and the substrate, and the wiring, the pads, and the like connecting the bonding wires and the second shunt element 1500.

The second shunt element 1500 is configured to include the resistance Rp and the capacitance Cp which are connected in series. In addition, the chip 11 and the second shunt element 1500 are connected via the inductance L. More specifically, one terminal of the inductance L is connected to the first node n1 in the equivalent circuit of the chip 11, and another terminal of the inductance L and one terminal of the resistance Rp are connected to a second node n2. Meanwhile, another terminal of the resistance Rp is connected to one terminal of the capacitance Cp. To another terminal of the capacitance Cp, the ground voltage is applied. The second node n2 is further connected to the terminal 181, and a voltage bias circuit V is connected thereto. Consequently, to the second node n2, the bias voltage is applied and, to the resistance r, the bias voltage is applied via the inductance L.

The first shunt element 1300 (the resistance Rc and the capacitance Cc) is connected in parallel to the negative differential resistance element (the resistance r), and is also connected in parallel to the second shunt element 1500 (the resistance Rp and the capacitance Cp) via the inductance L. Furthermore, the first shunt element 1300 is also connected in parallel to the voltage bias circuit V.

In such an antenna device, to suppress the parasitic oscillation, each of the first shunt element 1300 and the second shunt element 1500 has a low impedance with respect to the resistance r of the negative differential resistance element 127 used as a reference. In other words, in a frequency band lower than the terahertz frequency band, each of the first shunt element 1300 and the second shunt element 1500 is preferably set to have a low impedance when viewed from the negative differential resistance element 127. In this case, a conditional expression including Expressions (1) and (2) below is satisfied:

$$Rp+1/(2\pi\times f\times Cp)<r \tag{1}$$

$$Rc+1/(2\pi\times f\times Cc)<r \tag{2}$$

where r is an absolute value of a resistance value of the negative differential resistance element, Rc is a resistance value of the resistance Rc corresponding to a first resistor, and Cc is a capacitance value of the capacitance Cc corresponding to a first capacitor. Also, Rp is a resistance value of the resistance Rp corresponding to a second resistor, Cp is a capacitance value of the capacitance Cp corresponding to a second capacitor, and L is the inductance of the path connecting the first shunt element 1300 and the second shunt element 1500. Also, f represents a frequency of the targeted parasitic oscillation, which is a frequency less than a resonance frequency of each of the resonance circuits included in the antenna array 12. The frequency f is specifically less than 30 GHz, and is particularly a frequency in a range of 10 MHz to 10 GHz in a case where the chip 11 is mounted on the substrate 10 used in the present embodiment.

However, even when Expressions (1) and (2) are satisfied, LC resonance in the inductance L and the capacitance Cc may possibly occur. To suppress the LC resonance, it is necessary to ensure Rc in order to cause an oscillation energy loss, and it is preferable to reduce L and increase Cc. Therefore, to suppress the capacitive oscillation, a conditional expression including Expression (3) below is also satisfied:

$$L/(Cc\times r)<Rc \tag{3}$$

Figure 6:
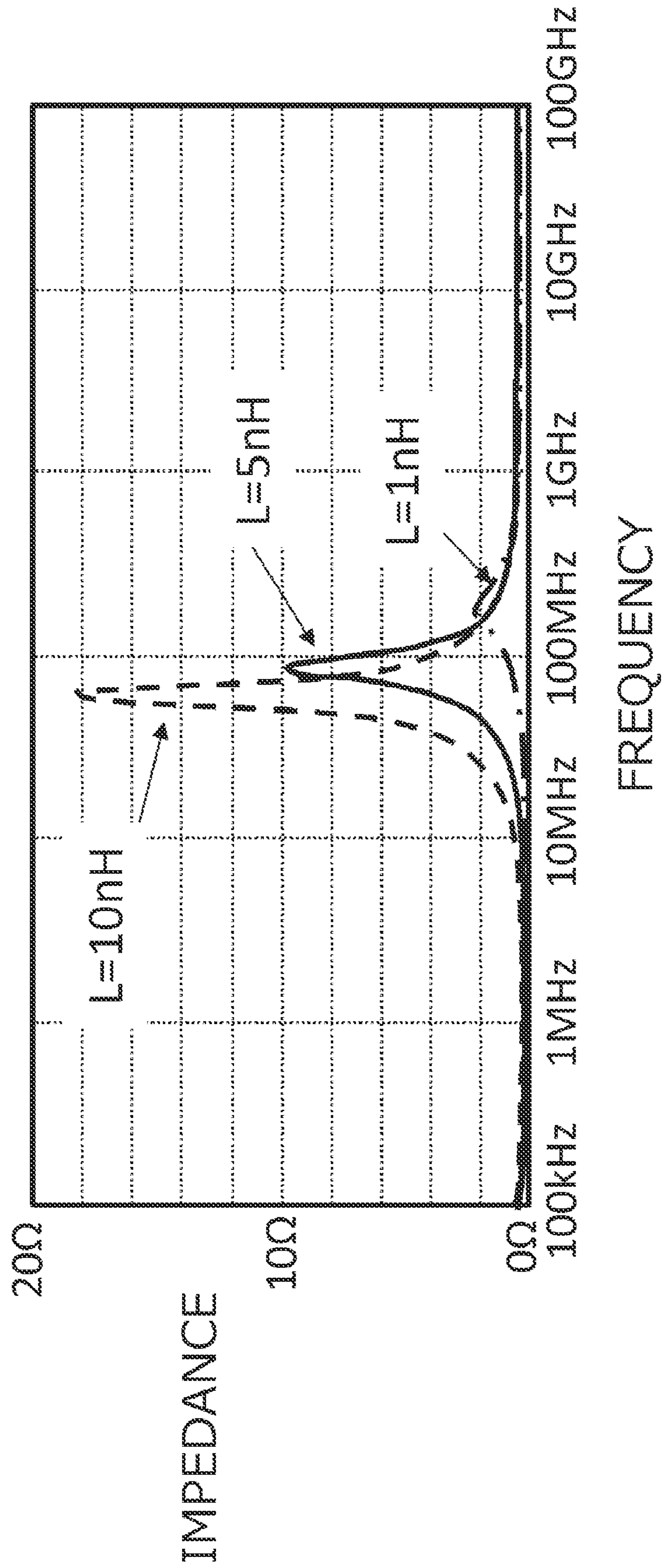
FIG. 6 illustrates a graph illustrating the antenna device according to the first embodiment.

FIG. 6 is a graph representing a frequency characteristic of the impedance when viewed from the negative differential resistance element 127 when a value of the inductance L is varied on the basis of the equivalent circuit in FIG. 5. A broken line represents a characteristic with respect to L=1 nH, a solid line represents a characteristic with respect to 5 nH, a dash-dot line represents a characteristic with respect to 10 nH, and the impedance has a peak value at a specified frequency. Specifically, with respect to L=1 nH, a peak value is 1.8Ω at 160 MHz, with respect to L=5 nH, a peak value is 16.8Ω at 50 MHz, and, with respect to L=10 nH, a peck value is 8.5Ω at 71 MHz.

Figure 7:
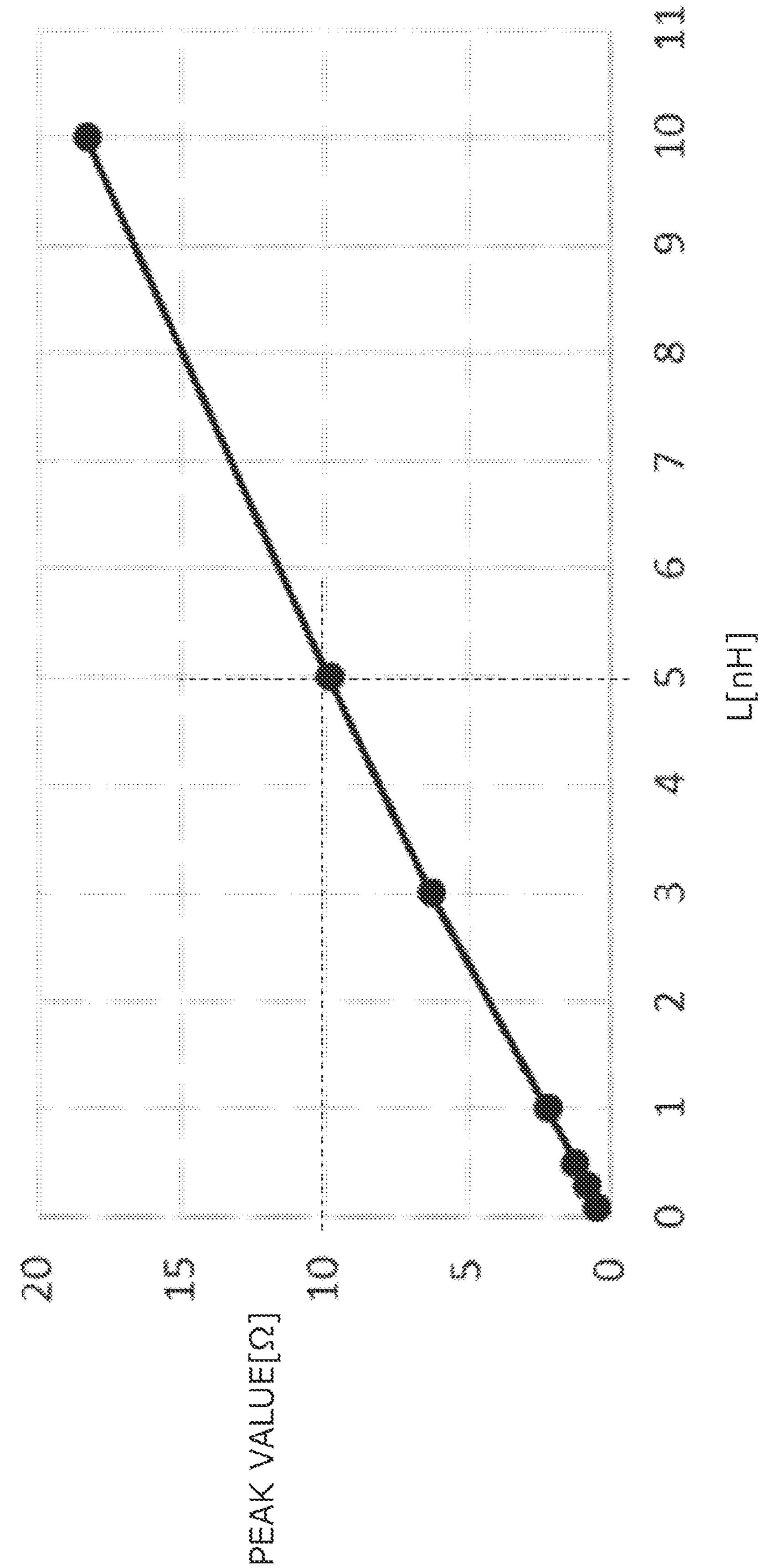
FIG. 7 illustrates a graph illustrating the antenna device according to the first embodiment.

FIG. 7 is a graph representing a relationship between the inductance L and the peak value of the inductance when viewed from the negative differential resistance element 127 on the basis of the frequency characteristic in FIG. 6. According to FIG. 7, as the inductance L increases, the peak value of the impedance increases.

At the frequency f of the capacitive oscillation to be suppressed, when the impedance of a line when viewed from the negative differential resistance element 127 is not more than 10 times the absolute value of the negative differential resistance, a magnitude of a loss due to the line with respect to a gain of the negative differential resistance element 127 can no longer be ignored. Thus, it is possible to suppress oscillation of the LC resonance. By way of example, in an antenna array having a chip size of 3 mm square to 4 mm square, 20 to 40 antennas can be arranged, and a combined resistance value of the negative differential resistance elements 127 is 1Ω at most, i.e., not more than 1Ω. Accordingly, as long as a resistance value is not more than 10Ω which is ten times this resistance value, the parasitic oscillation can be suppressed. In other words, according to the graph in FIG. 7, L≤5 nH needs only to be satisfied.

The inductance L includes the respective parasitic inductances of the wiring connecting the first shunt element 1300 and the pad 141, the bonding wires connecting the chip and the substrate, and the wiring, the pads, and the like connecting the bonding wires and the second shunt element 1500. Each of these inductances of the path connecting the first shunt element 1300 and the second shunt element 1500 can be calculated using Expressions (4) and (5) below. Of the path connecting the first shunt element 1300 and the second shunt element 1500, a portion having a cross section that can be approximated to a substantially circular shape is calculated using Expression (4), while a portion thereof having a cross section that can be approximated to a quadrilateral shape is calculated using Expression (5).

$$L1=0.2\times l1\times[\ln(4\times l1/d)-0.75]\ [\mathrm{nH}] \tag{4}$$

$$L2=0.2\times l2\times[\ln\{2\times l2/(w+h)\}+0.2235]\times(w+h)/l2+0.5\ [\mathrm{nH}] \tag{5}$$

where l1 is a length (mm) of the portion of the path having the cross section that can be approximated to the substantially circular shape, and d is a diameter (mm) of a cross section thereof. Also, l2 is a length (mm) of the portion of the path having the cross section that can be approximated to the quadrilateral shape, w is a width (mm) thereof, and h is a thickness (mm) thereof.

Figure 8:
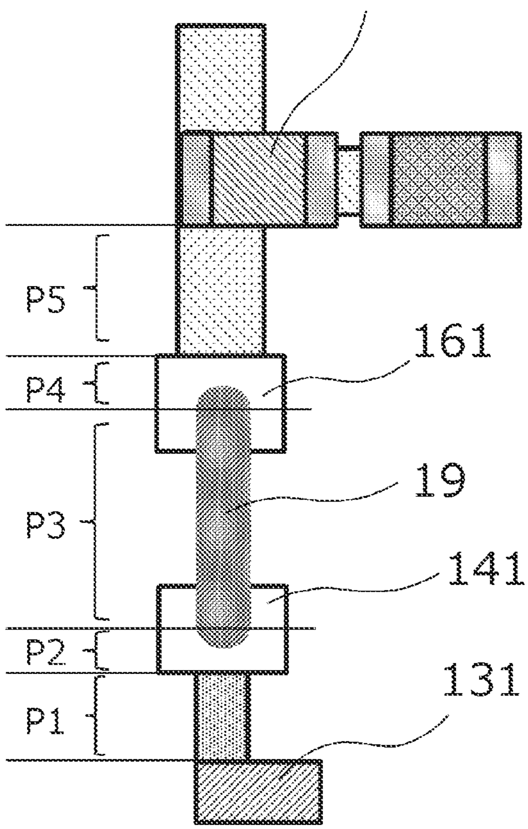
FIG. 8 illustrates a diagram illustrating the antenna device according to the first embodiment.

FIG. 8 is a diagram illustrating the inductance of the path connecting the first shunt element 1300 and the second shunt element 1500 in the present embodiment. The path connecting the first shunt element 1300 and the second shunt element 1500 has wiring (first portion P1) connecting the resistance element 131 included in the first shunt element 1300 and the pad 141 as well as the pad 141 (second portion P2). The path further has the bonding wire 19 (third portion P3), the pad 161 (fourth portion P4), and wiring (fifth portion P5) connecting the pad 161 and the resistance element 151 included in the second shunt element 1500.

A length of the path connecting the first shunt element 1300 and the second shunt element 1500 is preferably not more than 4 mm, which is appropriate to reduce the parasitic inductance and suppress the parasitic oscillation. More preferably, the length of the path is not more than 2 mm.

A description will be given below of dimensions of each of the portions of the path as well as an example of the inductance calculated using Expression (4) or Expression (5).

The first portion P1 has a length of 0.3 mm, a width of 0.2 mm, and a thickness of 0.5 μm, and an inductance L1 of this region is calculated using Expression (5) to be 0.1 nH.

An inductance L2 of the second portion P2 is calculated on the assumption that the second portion P2 is a region from an end portion of the pad 141 to substantially a center portion of the pad 141 to which the bonding wire 19 is connected. This region has a length of 0.1 mm, a width of 0.2 mm, and a thickness of 0.5 μm, and the inductance L2 of this region is calculated using Expression (5) to be 0.02 nH.

The third portion P3 is the bonding wire having a length of 1.0 mm and a cross section diameter of 20 μm, and an inductance L3 of this region is calculated using Expression (4) to be 0.91 nH.

An inductance L4 of the fourth portion P4 is calculated on the assumption that the fourth portion P4 is a region from an end portion of the pad 161 to substantially a center portion of the pad 161 to which the bonding wire 19 is connected. This region has a length of 0.6 mm, a width of 1.2 mm, and a thickness of 35 μm, and the inductance L4 is calculated using Expression (5) to be 0.11 nH.

The fifth portion P5 has a length of 0.8 mm, a width of 0.6 mm, and a thickness of 35 μm, and an inductance L5 of this region is calculated using Expression (5) to be 0.26 nH.

Accordingly, the inductance of the path connecting the first shunt element 1300 and the second shunt element 1500 can be calculated as a total of the inductances L1, L2, L3, L4, and L5 to be 1.4 nH.

In the present embodiment, the inductance is calculated using Expression (4) on the assumption that the bonding wire 19 has a circular cross section, but it may also be possible to use a ribbon-shaped bonding wire having a quadrilateral cross section. In a case of the ribbon-shaped bonding wire, the inductance can be calculated using Expression (5). The ribbon-shaped bonding wire can have a large cross-sectional area, and the inductance can be reduced.

Figure 9B:
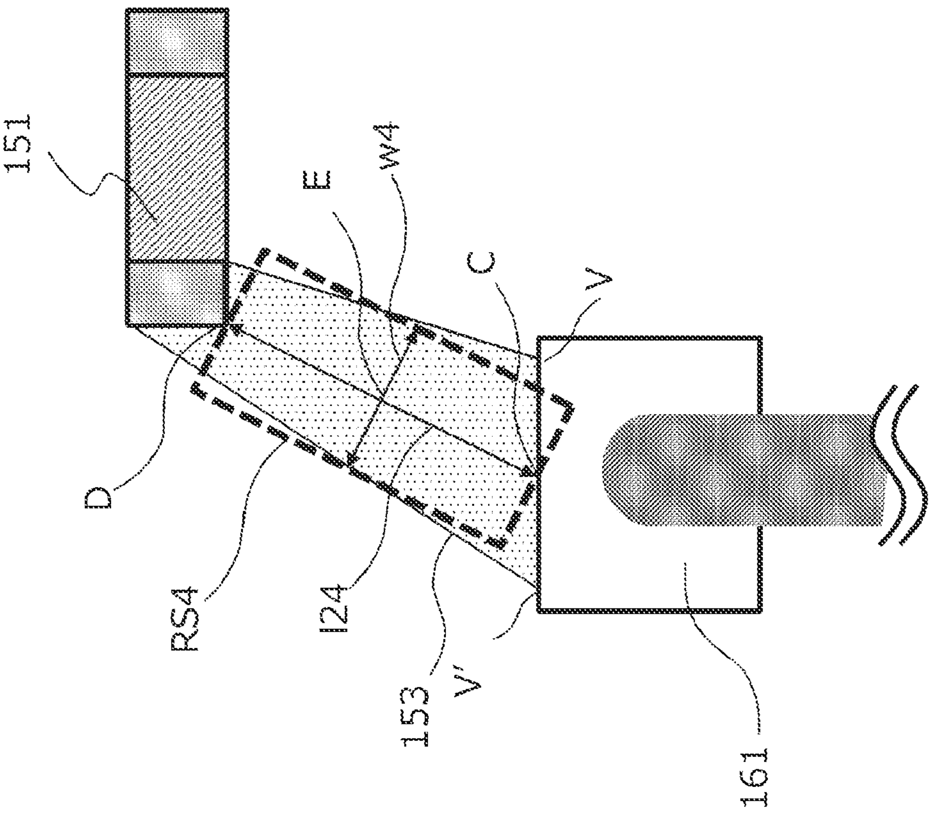
FIGS. 9A and 9B illustrate diagrams illustrating the antenna device according to the first embodiment.
Figure 9A:
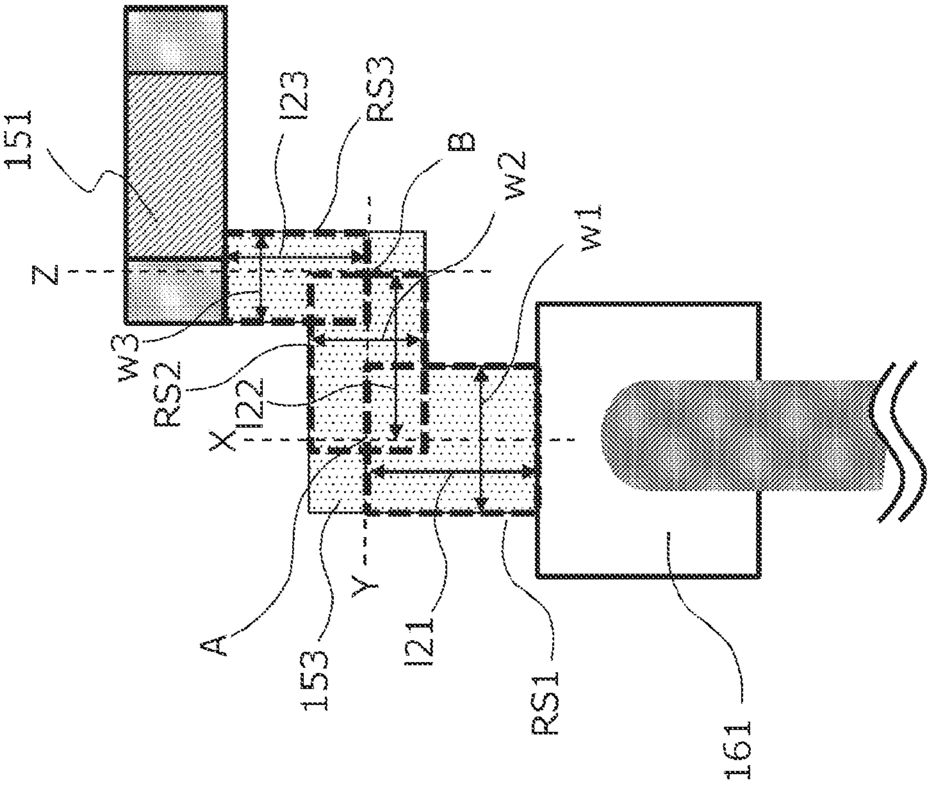

FIGS. 9A and 9B are diagrams illustrating the calculation of the inductance of the wiring. A description will be given herein by using the wiring 153 connecting the pad 161 and the resistance element 151 included in the second shunt element 1500. The wiring connecting the resistance element 131 included in the first shunt element 1300 and the pad 141 can also be considered in the same manner.

FIG. 9A is a diagram illustrating an example of a configuration in which the wiring 153 has bent portions. In the example illustrated in FIG. 9A, the wiring 153 is configured to include the bent portions having two 90-degree bent portions. The inductance of the wiring 153 in the example illustrated in FIG. 9A can be calculated by dividing the wiring 153 into three rectangular portions. The three rectangular portions are a first rectangular portion RS1 connected to the pad 161, a second rectangular portion RS2 connected to the first rectangular portion, and a third rectangular portion RS3 connected to the second rectangular portion. The third rectangular portion RS3 is connected to the resistance element 151. The first rectangular portion RS1 has a length 121, a width w1, and a thickness h1, the second rectangular portion RS2 has a length 122, a width w2, and a thickness h2, and the third rectangular portion RS3 has a length 123, a width w3, and a thickness h3. Using Expression (5), respective inductances of the individual rectangular portions are calculated, and a total thereof is assumed to be the inductance of the wiring 153.

An example of a method of determining the lengths 121, 122, and 123 will be described. It is assumed that a point of intersection of a line X passing through a middle of the first rectangular portion RS1 in a width direction and extending in a length direction and a line Y passing through a middle of the second rectangular portion RS2 in the width direction and extending in the length direction is a point A. It is also assumed that a point of intersection of the line Y and a line Z passing through a middle of the third rectangular portion RS3 in the width direction and extending in the length direction is a point B. Then, it is assumed that a distance between the end portion of the pad 161 and the point A is the length 121 of the first rectangular portion, a distance between the point A and the point B is the length 122 of the second rectangular portion RS2, and a distance between the point B and an end portion of the resistance element 151 is the length 123 of the third rectangular portion RS3.

As the method of determining the length 121, the length 122, and the length 123, a determination method other than that described above may also be adopted as long as the wiring 153 is divided, and the rectangular portions can be specified.

Next, FIG. 9B is a diagram illustrating an example in which the wiring 153 is configured to linearly extend, while a width thereof gradually increases from the resistance element 151 toward the pad 161. Even with the wiring 153 thus configured, by replacing the wiring 153 with a rectangular portion RS4 as illustrated in the figure, it is possible to calculate the inductance of the wiring 153 by using Expression (5). The rectangular portion RS4 has a length 124, a width w4, and a thickness h4.

Next, an example of a method of determining the length 124 and the width w4 of the rectangular portion RS4 will be described. A center point C of a portion V-V' along which the wiring 153 and the pad 161 are in contact is defined, and a point D which allows contact with the resistance element 151, while having a shortest distance to the point C, is defined. It is assumed that the distance between the point C and the point D is the length 124. It is also assumed that a distance between end portions of the wiring in a direction perpendicular to a line segment CD via a middle E between the point C and the point D is the width w4.

Thus, according to the determination method described using FIGS. 9A and 9B, the inductance of the wiring can be calculated.

According to the present embodiment, by configuring the shunt elements so as to satisfy Expression (1), Expression (2), and Expression (3), the parasitic oscillation can be suppressed. In addition, when the inductance L of the path connecting the first shunt element 1300 and the second shunt element 1500, which is used in Expression (3), is determined, it is possible to apply the calculation methods described using Expression (4), Expression (5), FIG. 8, and FIG. 9.

Second Embodiment

Using FIG. 10, a description will be given of an antenna device according to the second embodiment of the present disclosure. In the second embodiment, unlike in the first embodiment, a pad and a pad are connected with a plurality of bonding wires. Note that, in the present embodiment, a description of the same components as those in the first embodiment is omitted.

Figure 10:
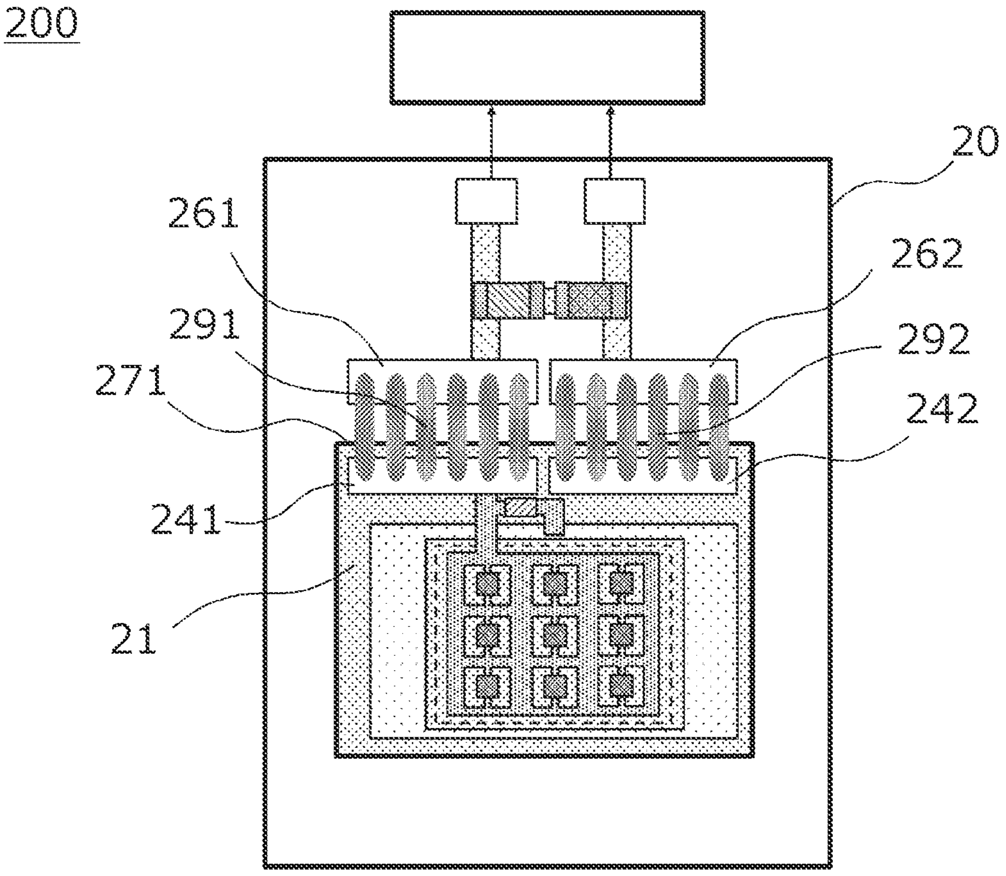
FIG. 10 illustrates an example of a plan view of an antenna device according to a second embodiment.

In an antenna device 200 illustrated in FIG. 10, a chip 21 includes a pad 241 for applying a bias voltage and a pad 242 that applies a ground voltage. In addition, a substrate 20 includes a pad 261 for connection to the pad 241 of the chip 21 and a pad 262 for connection to the pad 242 of the chip 21. The substrate 20 also has a plurality of bonding wires 291 for connecting the pad 241 and the pad 261 and a plurality of bonding wires 292 for connecting the pad 242 and the pad 262. Besides these, an antenna array, a first shunt element, a second shunt element, and the like in the antenna device 200 are the same as those in the antenna device 100 in the first embodiment.

To reduce inductances of the bonding wires 291 and 292, it is preferable to arrange the pad 241 and the pad 261 as well as the pad 242 and the pad 262 adjacent to each other and thereby shorten the bonding wires 291 and 292.

To shorten the bonding wires 291 and 292, the pad 241 and the pad 242 are preferably placed on end portions of the chip 21. When it is assumed that a side of the chip 21 traversed by the plurality of bonding wires 291 and 292 is a first side 271, the pad 241 and the pad 261 are arranged so as to face each other with the first side 271 being interposed therebetween. In addition, the pad 242 and the pad 262 are also arranged so as to face each other with the first side 271 being interposed therebetween. Furthermore, the plurality of bonding wires 291 and 292 are arranged side by side to be spaced apart from each other in a direction parallel to the first side 271.

The plurality of bonding wires 291 and 292 are electrically connected in parallel. A combined inductance Lm of M bonding wires connected in parallel can be calculating using Expression (6) below.

$$1/Lm=\Sigma(1/Li)(i=1,2,3,\ldots,M) \quad (6)$$

where Li is an inductance of the i-th bonding wire among the M bonding wires and, when the bonding wires have circular cross sections, the calculation is performed using Expression (4) while, when the bonding wires have quadrilateral cross sections, the calculation is performed using Expression (5). Note that whether the bonding wires have the circular cross sections or the quadrilateral cross sections may be determined as appropriate, and the combined inductance Lm of the bonding wires may appropriately be calculated using Expressions (4) and (5).

By thus electrically connecting the plurality of bonding wires 291 and 292 in parallel, it is possible to reduce the combined inductance of the bonding wires 291 and 292 and thereby allow easy suppression of parasitic oscillation.

In the present embodiment, areas of the pads 241 and 242 are set larger than those of the pads 141 and 142 in the first embodiment, and areas of the pads 261 and 262 are set larger than those of the pads 161 and 162 in the first embodiment. Thus, it is possible to increase the number of the bonding wires providing connection between the pads and reduce the combined inductance of the plurality of bonding wires.

The pads 241, 242, 261, and 262 are configured such that dimensions thereof in directions parallel to the first side 271 of the chip 21 are larger than dimensions thereof in directions perpendicular to the first side 271. This can increase the number of the bonding wires that can be placed and reduce the combined inductance of the bonding wires.

In the same manner as in the first embodiment, it is also possible to divide the pads 241, 242, 261, and 262 on a per bonding wire basis. In this case, it is only required to provide a configuration in which connection is provided with a wiring layer underlying a metal layer forming the pads. However, such a configuration as illustrated in FIG. 10 in which a plurality of bonding wires are placed on one pad avoids the need to ensure spaces separating the pads, and allows easy pattern formation. Accordingly, by adopting the configuration illustrated by way of example in FIG. 10, it is possible to use a low-cost printed substrate or ceramic package as the substrate 20 and allow a cost reduction.

Third Embodiment

Using FIG. 11, a description will be given of an antenna device according to the third embodiment of the present disclosure. The third embodiment is different from the first embodiment in that additional resistance elements and capacitance elements are included in a first shunt element and a second shunt element to be connected in parallel. In the present embodiment, a description of the same components as those in the first and second embodiments is omitted.

Figure 11:
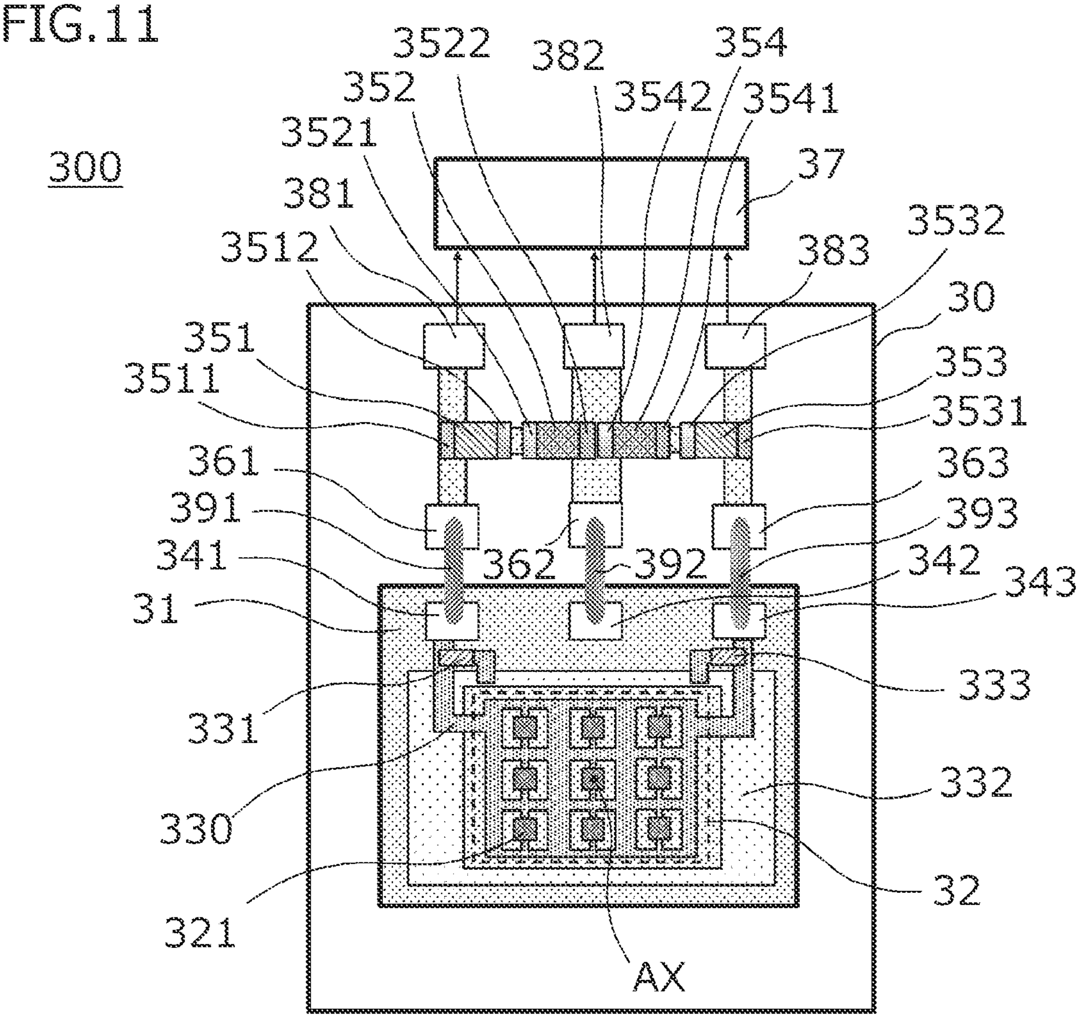
FIG. 11 illustrates an example of a plan view of an antenna device according to a third embodiment.

In an antenna device 300 in the present embodiment illustrated in FIG. 11, a chip 31 includes a first shunt element including a resistance element 331 and a capacitance element 332 and another first shunt element including a resistance element 333 and the capacitance element 332. In addition, in the antenna device 300, the chip 31 includes pads 341 and 343 for applying a bias voltage and a pad 342 that applies a ground voltage. Furthermore, a substrate 30 includes a second shunt element including a resistance element 351 and a capacitance element 352 and another second shunt element including a resistance element 353 and a capacitance element 354.

The substrate 30 also includes a pad 361 for connection to the pad 341 of the chip 31, a pad 362 for connection to the pad 342 of the chip 31, and a pad 363 for connection to the pad 343 of the chip 31. The pad 341 and the pad 361 are connected with a bonding wire 391, the pad 342 and the pad 362 are connected with a bonding wire 392, and the pad 343 and the pad 363 are connected with a bonding wire 393. The substrate 30 further includes connection terminals 381 and 383 to which the bias voltage is applied from a voltage bias circuit 37 and the connection terminal 382 that gives the ground voltage.

In FIG. 11, the pads 341, 342, and 343 of the chip 31 and the pads 361, 362, and 363 of the substrate 30 are connected, on a one-to-one basis, with the respective bonding wires 391, 392, and 393. However, as in the second embodiment, the two pads may also be connected with a plurality of bonding wires. Alternatively, as illustrated in FIG. 3, the two pads may also be connected with through electrodes instead of using the bonding wires 391, 392, and 393.

An antenna array 32 is placed at substantially a center of the chip 31 in the same manner as in the first embodiment, and the capacitance element 332 is placed adjacent to the antenna array 32. One terminal of the resistance element 331 is connected to one terminal of the capacitance element 332 via wiring and a via (not shown). One terminal of the resistance element 333 is connected to one terminal of the capacitance element 332 via wiring and a via (not shown). The resistance elements 331 and 333 are preferably placed in the vicinity of the capacitance element 332. Alternatively, the resistance elements 331 and 333 may also be placed on the capacitance element 332 in overlapping relation thereto. Another terminal of the resistance element 331 is connected to the pad 341 via a bias voltage line 330. The bias voltage line 330 is placed also between individual antennas 321 of the antenna array 32 to be connected to each of the antennas 321. Thus, the bias voltage is applied to each of the antennas 321. Another terminal of the capacitance element 332 is connected to the pad 342 via wiring and a via (not shown). Another terminal of the resistance element 333 is connected to the pad 343 via the bias voltage line 330.

One terminal 3512 of the resistance element 351 is connected to the one terminal 3521 of the capacitance element 352 via wiring. In other words, the resistance element 351 and the capacitance element 352 are connected in series. Accordingly, the resistance element 351 and the capacitance element 352 are preferably arranged adjacent to each other. More preferably, the one terminal 3512 of the resistance element 351 is placed adjacent to the one terminal 3521 of the capacitance element 352 to be able to shorten the wiring and reduce the inductance.

Another terminal 3511 of the resistance element 351 is connected to the pad 361 via wiring and also connected to the connection terminal 381 via the wiring. Meanwhile, another terminal 3522 of the capacitance element 352 is connected to the pad 362 via wiring, and is also connected to a connection terminal 382 via wiring.

One terminal 3532 of the resistance element 353 is connected to one terminal 3541 of the capacitance element 354 via wiring. In other words, the resistance element 353 and the capacitance element 354 are connected in series. Accordingly, the resistance element 353 and the capacitance element 354 are preferably arranged adjacent to each other. More preferably, the one terminal 3532 of the resistance element 353 and the one terminal 3541 of the capacitance element 354 are arranged adjacent to each other to be able to shorten the wiring and reduce the inductance.

Another terminal 3531 of the resistance element 353 is connected to the pad 363 via wiring, and is also connected to the connection terminal 383 via wiring. Meanwhile, another terminal 3542 of the capacitance element 354 is connected to the pad 362 via wiring, and is also connected to the connection terminal 382 via wiring.

In FIG. 11, the terminals 3511 and 3512 of the resistance element 351, the terminals 3521 and 3522 of the capacitance element 352, the terminals 3531 and 3532 of the resistance element 353, and the terminals 3541 and 3542 of the capacitance element 354 are arranged side by side in one direction (left-right direction in the figure) over the substrate 30. In the present embodiment, the pads 361, 362, and 363 are also arranged side by side in the same direction as the direction in which the terminals 3511, 3512, 3521, 3522, 3531, 3532, 3541, and 3542 are arranged. By thus arranging the terminals and the pads, it is possible to shorten the connecting wiring and reduce the inductance.

Since the bias voltage is supplied from the voltage bias circuit 37 to both of the connection terminals 381 and 383, the other terminal 3511 of the resistance element 351 and the other terminal 3531 of the resistance element 353 are electrically connected. Meanwhile, the other terminal 3522 of the capacitance element 352 and the other terminal 3542 of the capacitance element 354 are commonly connected via the wiring. As a result, the resistance element 351 and the capacitance element 352 each included in the second shunt element and the resistance element 353 and the capacitance element 354 each included in the other second shunt element are electrically connected in parallel. As each of the resistance elements 351 and 353 and the capacitance elements 352 and 354, e.g., a SMD (Surface Mount Device) is adopted, and such a component has not only a resistive component and a capacitive component, but also a parasitic inductance. Accordingly, in two pairs of the first shunt elements and the second shunt elements, the second shunt elements in the respective pairs (the resistance element 351, the capacitance element 352, the resistance element 353, and the capacitance element 354) are connected in parallel. Thus, it is possible to reduce the parasitic inductance and suppress the parasitic oscillation.

In addition, since the bonding wire 391 and the bonding wire 393 each serving as a path that supplies the bias voltage are connected in parallel, a combined inductance of the bonding wires is also reduced.

Moreover, since the wiring placed in the substrate 30 also has a resistance value, as each of the resistance elements 351 and 353, a resistance of the wiring in the substrate 30 connecting the first shunt elements and the second shunt elements may also be used. This can reduce the number of components to be placed over the substrate 30, which is advantageous for a size reduction.

In the chip 31, the elements and pads that are arranged over the chip 31 and the elements, pads, wiring, and the like arranged over the substrate 30 are arranged symmetrically with respect to an axis passing through a center of the antenna array 32. Examples of the axis passing through the center of the antenna array 32 include an axis AX extending in a direction perpendicular to the top surface of the substrate 30 and an axis extending in a direction parallel to the top surface of the substrate 30. Symmetricity is determined herein on the basis of the axis extending in the direction parallel to the top surface of the substrate. The center of the antenna array 32 can be determined on the basis of a planar shape of the conductor of the antenna array 32. The center of the antenna array 32 may also be a gravity center of the conductor of the antenna array 32. The gravity center can be determined on the basis of a cross-sectional shape and a planar shape. Therefore, in the substrate 30, the plurality of pairs of the first shunts and the second shunt elements which are connected to each other are arranged, and at least two of the pairs of the first shunt elements and the second shunt elements are placed at positions symmetrical to each other with respect to the axis passing through the center of the antenna array. This improves a directionality of a terahertz wave generated from the antenna array 32 and enhances a frontal intensity of the terahertz wave.

In the present embodiment, a configuration is adopted in which the bias voltage is supplied from two paths using the connection terminals 381 and 383, and the ground voltage is given from one path using the connection terminal 182. However, it may also be possible to use a configuration in which the ground voltage is given from the two paths using the connection terminals 381 and 383, and the bias voltage is supplied from the one path using the connection terminal 182.

Fourth Embodiment

Using FIGS. 12 to 14, a description will be given of an antenna device according to the fourth embodiment of the present disclosure. The antenna device according to the fourth embodiment is different from the antenna device according to the first embodiment in that pads are arranged on both sides on which two facing sides of a chip are present, i.e., the pads and the chip are arranged such that the chip is interposed between the pads. In the present embodiment, a description of the same components as those in the embodiments described above is omitted.

Figure 12:
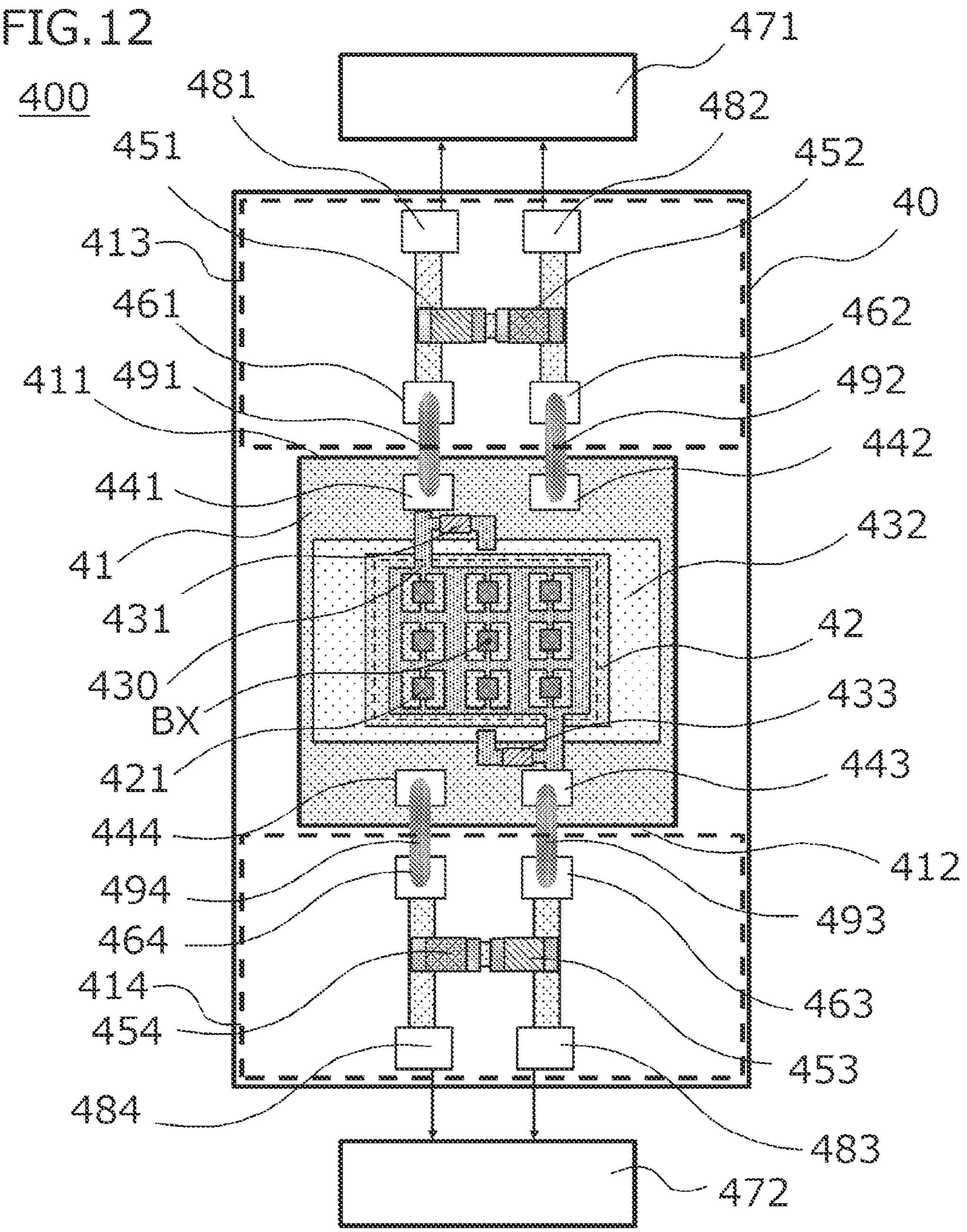
FIG. 12 illustrates an example of a plan view of an antenna device according to a fourth embodiment.

In an antenna device 400 according to the present embodiment illustrated in FIG. 12, a chip 41 includes, in the same manner as in the first embodiment, a pad 441 for applying a bias voltage and a pad 442 that applies a ground voltage. In addition, unlike in the first embodiment, the antenna device 400 includes a pad 443 for applying the bias voltage and a pad 444 for applying the ground voltage.

On the chip 41, the pads 441 and 442 are arranged on a side on which a first side 411 of the chip 41 is present when viewed from an antenna array 42. Meanwhile, on the chip 41, the pad 443 and the pad 444 are arranged on a side on which a second side 412 of the chip 41 facing the first side 411 is present when viewed from the antenna array 42. This results in a configuration in which, between the pads 441 and 442 and the pads 443 and 444, an antenna array 42 is placed. Thus, the two pairs of the first shunt elements and the second shunt elements are arranged such that the antenna array is interposed between the respective pairs of the first shunt elements and the second shunt elements.

In addition, in the chip 41, a resistance element 431, a capacitance element 432, and a resistance element 433 which are included in the first shunt element are arranged.

One terminal of the resistance element 431 is connected to one terminal of the capacitance element 432 via wiring and a via (not shown). Preferably, the resistance element 431 is placed in the vicinity of the capacitance element 432. Alternatively, the resistance element 431 may also be placed on the capacitance element 432 in overlapping relation thereto. Meanwhile, another terminal of the resistance element 431 is connected to the pad 441 via a bias voltage line 430. The bias voltage line 430 is placed also between the individual antennas 421 of the antenna array 42 to be connected commonly to the individual antennas 421, and the bias voltage is applied to each of the antennas 421.

One terminal of the resistance element 433 is connected to one terminal of the capacitance element 432 via wiring and a via (not shown). Preferably, the resistance element 433 is placed in the vicinity of the capacitance element 432. Alternatively, the resistance element 433 may also be placed on the capacitance element 432 in overlapping relation thereto. Meanwhile, another terminal of the resistance element 433 is connected to the pad 443 via the bias voltage line 430. Another terminal of the capacitance element 432 is connected to the pads 442 and 444 via wiring a vias (not shown).

On the chip 41, between the pads 441 and 442 and the pads 443 and 444, the resistance element 431 and the resistance element 433 are arranged. Meanwhile, between the resistance element 431 and the resistance element 433, the antenna array 42 around which the capacitance element 432 is placed is placed. Thus, the pads and the first shunt element are arranged symmetrically with respect to an axis passing through a center of the antenna array 42 (an axis BX extending in a direction perpendicular to a top surface of the substrate 40). Therefore, in the substrate 40, the plurality of pairs of the first shunts and the second shunt elements which are connected to each other are arranged, and at least two of the pairs of the first shunt elements and the second shunt elements are arranged at positions symmetrical to each other with respect to the axis passing through the center of the antenna array. This improves a directionality of a terahertz wave generated from the antenna array 42 and enhances a frontal intensity of the terahertz wave.

In the substrate 40, in a first region 413 (region surrounded by a dotted line in the figure) present on the side of the chip 41 with the first side 411, in the same manner as in the first embodiment, a resistance element 451 and a capacitance element 452 each included in the second shunt element are arranged. In addition, in the first region 413, a pad 461 to be connected to the pad 441 of the chip 41 with a bonding wire 491 and a pad 462 to be connected to the pad 442 of the chip 41 with a bonding wire 492 are arranged. Furthermore, in the first region 413, a connection terminal 481 to which the bias voltage is to be supplied from a voltage bias circuit 471 and a connection terminal 482 that gives the ground voltage are arranged.

Also, in the substrate 40, in a second region 414 (region surrounded by a dotted line in the figure) present on the side of the chip 41 with the second side 412, a resistance element 453 and a capacitance element 454 each included in the second shunt element are arranged. In addition, in the second region 414, a pad 463 to be connected to the pad 443 of the chip 41 with a bonding wire 493 and a pad 464 to be connected to the pad 444 of the chip 41 with a bonding wire 494 are arranged. Furthermore, in the second region 414, a connection terminal 483 to which the bias voltage is to be supplied from a voltage bias circuit 472 and a connection terminal 484 that gives the ground voltage are arranged.

In the description given above, the voltage bias circuits 471 and 472 are provided as separate circuits, but the substrate 40 may also be configured such that one voltage bias circuit supplies the bias voltage and the ground voltage.

Thus, the substrate 40 has a configuration in which the chip 41 is placed between the first region 413 and the second region 414. In this configuration, between the pads 441 and 442 and the pads 443 and 444, the antenna array 42 is placed. In other words, in a direction along a line segment connecting the side 411 and the side 412, the first region 413, the chip 41, and the second region 414 are arranged in this order. Such a configuration can reduce the impedance of the wiring that supplies the bias voltage. In addition, between the resistance element 451 or the capacitance element 452 and the resistance element 453 or the capacitance element 454, the chip 41 is placed. As a result, in the same manner as in the case of the first shunt elements, the pads and the second shunt elements are arranged symmetrically with respect to the axis passing through the center of the antenna array 42. Examples of the axis passing through the center of the antenna array 42 include the axis BX extending in the direction perpendicular to the top surface of the substrate 40 and an axis extending in a direction parallel to the top surface of the substrate 40. Symmetricity is determined herein on the basis of the axis extending in the direction parallel to the top surface of the substrate. Therefore, in the substrate 40, the plurality of pairs of the first shunts and the second shunt elements which are connected to each other are arranged, and at least two of the pairs of the first shunt elements and the second shunt elements are arranged at positions symmetrical to each other with respect to the axis passing through the center of the antenna array. This improves the directionality of the terahertz wave generated from the antenna array 42 and enhances the frontal intensity of the terahertz wave.

In addition, according to the present embodiment, the bias voltage to be applied to the antenna array 42 is supplied from the side of the chip 41 with the two facing sides 411 and 412. As a result, the impedance of the wiring that supplies the bias voltage is smaller than in a case where the bias voltage is supplied from a side of the chip 41 with any one of the sides, and accordingly a voltage drop is reduced. Consequently, antenna-to-antenna variation in the bias voltage to be applied to the negative differential resistance element of each of the antennas decreases to improve uniformities of antenna outputs.

In addition, the resistance element 451 and the capacitance element 452 and the resistance element 453 and the capacitance element 454, which are included in the second shunt elements, are connected in parallel. As each of the resistance elements 451 and 453 and the capacitance elements 452 and 454, e.g., the SMD is adopted, and such a component has not only a resistive component and a capacitive component, but also a parasitic inductance. Accordingly, by connecting the resistance element 451 and the capacitance element 452 and the resistance element 453 and the capacitance element 454 in parallel, it is possible to reduce the parasitic inductance and suppress the parasitic oscillation.

Moreover, since the wiring placed in the substrate 40 also has a resistance value, as each of the resistance elements 451 and 453, a resistance of the wiring may also be used, and the number of components to be placed over the substrate 40 can thus be reduced, which is advantageous for a size reduction.

Figure 13:
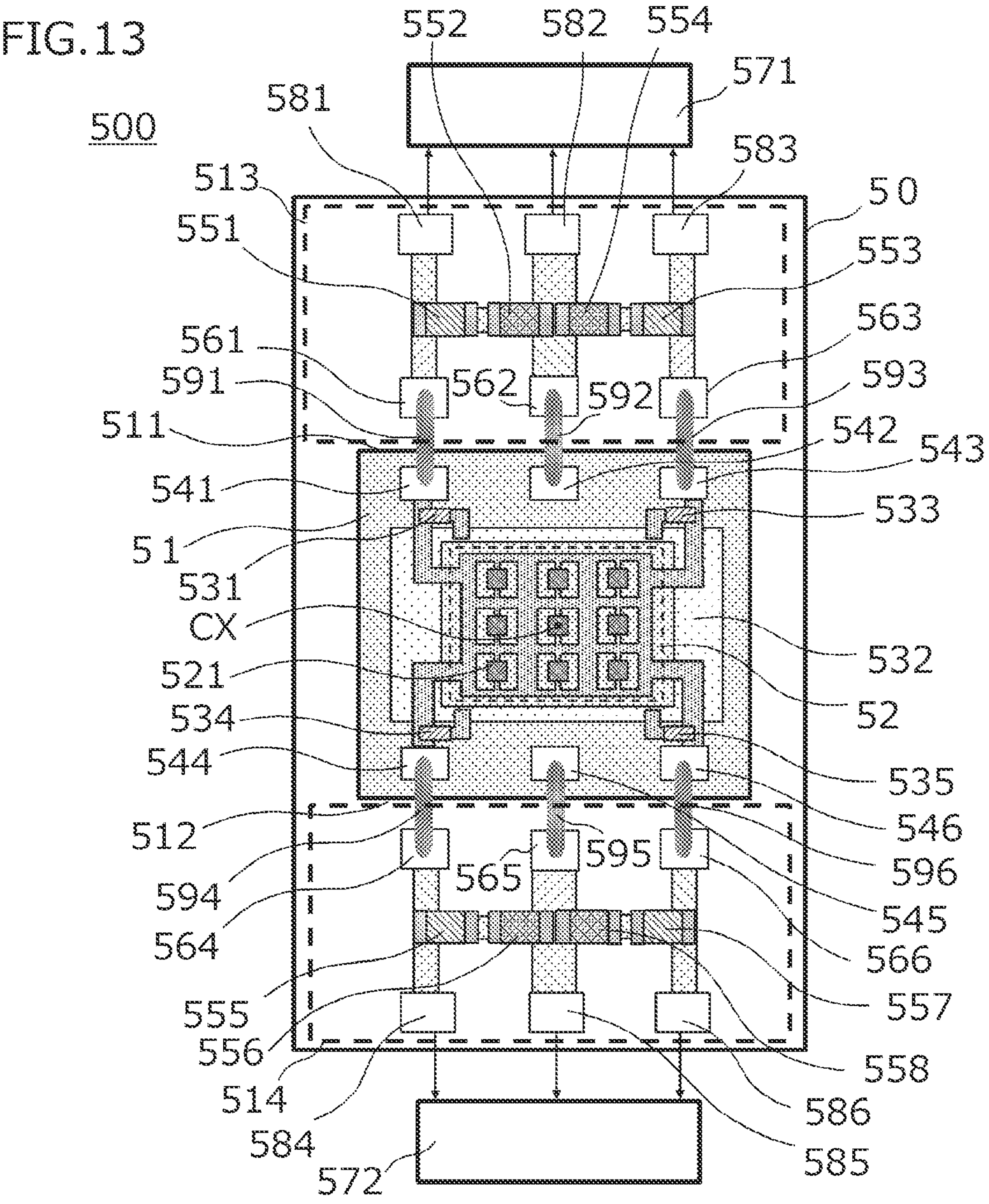
FIG. 13 illustrates an example of the plan view of the antenna device according to the fourth embodiment.

FIG. 13 is a diagram illustrating an antenna device according to a modification of the present embodiment. Note that, in the present modification, a description of the same components as those in the embodiments described above is omitted. A configuration of an antenna device 500 illustrated in FIG. 13 corresponds to a configuration obtained by further applying characteristic features of the present embodiment to the configuration illustrated in the third embodiment. In the present modification, the same components as those in the third embodiment are denoted by the same reference signs, and a description thereof is omitted.

In the antenna device 500, on a side of a top surface of a chip 51 on which a first side 511 of the chip 51 is present, resistance elements 531 and 533 and pads 541, 542, and 543 are arranged in the same manner as in the third embodiment. Meanwhile, on a side of the chip 51 on which a second side 512 thereof facing the first side 511 is present, resistance elements 534 and 535 and pads 544, 545, and 546 are arranged.

Between the first side 511 and the second side 512 of the chip 51, an antenna array 52 in which a plurality of antennas 521 are arranged is placed. Around the antenna array 52, the capacitance element 532 is placed. The capacitance element 532 is connected to each of the resistance elements 531, 533, 534, and 535 to be included in a first shunt element.

Respective one terminals of the resistance elements 531, 533, 534, and 535 are connected to one terminal of the capacitance element 532 via wiring and vias (not shown). The resistance elements 531, 533, 534, and 535 are preferably arranged in the vicinity of the capacitance element 532. Alternatively, the resistance elements 531, 533, 534, and 535 may also be placed on the capacitance element 532 in overlapping relation thereto. Respective other terminals of the resistance elements 531, 533, 534, and 535 are connected to the pad 541 via a bias voltage line 530. The bias voltage line 530 is placed also between the individual antennas 521 in the antenna array 52 to be connected commonly to the individual antennas 521, and a bias voltage is applied to each of the antennas 521. Another terminal of the capacitance element 532 is connected to the pads 542 and 545 via wiring and vias (not shown).

On the chip 51, between the pads 541, 542, and 543 and the pads 544, 545, and 546, the resistance elements 531 and 533 and the resistance elements 534 and 535 are arranged. In addition, between the resistance elements 531 and 533 and the resistance elements 534 and 535, the antenna array 52 around which the capacitance element 532 is placed is placed. Thus, the pads and the first shunt elements are arranged symmetrically with respect to an axis passing through a center of the antenna array 52. Examples of the axis passing through the center of the antenna array 52 include an axis CX extending in a direction perpendicular to a top surface of a substrate 50 and an axis extending in a direction parallel to the top surface of the substrate 50. Symmetricity is determined herein on the basis of the axis extending in the direction parallel to the top surface of the substrate. Therefore, in the substrate 50, the plurality of pairs of the first shunts and second shunt elements which are connected to each other are arranged, and at least two of the pairs of the first shunt elements and the second shunt elements are arranged at positions symmetrical to each other with respect to the axis pas sing through the center of the antenna array. This improves a directionality of a terahertz wave generated from the antenna array 52 and enhances a frontal intensity of the terahertz wave.

In the substrate 50, in a first region 513 (region surrounded by a dotted line in the figure) present on the side of the chip 51 with the first side 511, in the same manner as in the third embodiment, a pad 561 to be connected to the pad 541 of the chip 51 with a bonding wire 591 is placed. In addition, in the first region 513, a pad 562 to be connected to the pad 542 with a bonding wire 592 and a pad 563 to be connected to the pad 543 with a bonding wire 593 are arranged. Moreover, in the first region 513, resistance elements 551 and 553 and capacitance elements 552 and 554 which are included in the second shunt elements are arranged. Furthermore, in the first region 513, connection terminal 581 and 583 to which the bias voltage is to be supplied from a voltage bias circuit 571 as well as a connection terminal 582 that gives the ground voltage are arranged. Note that mutual connection relationships between the individual pads, the second shunt elements, and the connection terminals are the same as the connection relationships described in the third embodiment.

In the description given above, the voltage bias circuits 571 and 572 are provided as separate circuits, but the substrate 50 may also be configured such that one voltage bias circuit supplies the bias voltage and the ground voltage.

Also, in the substrate 50, in a second region 514 (region surrounded by a dotted line in the figure) present on the side of the chip 51 with the second side 512, a pad 564 to be connected to the pad 544 of the chip 51 with a bonding wire 594 is placed. In addition, in the second region 514, a pad 565 to be connected to the pad 545 with a bonding wire 595 and a pad 566 to be connected to the pad 546 with a bonding wire 596 are arranged. Moreover, in the second region 514, resistance elements 555 and 557 and capacitance elements 556 and 558 which are included in the second shunt elements are arranged. Furthermore, in the second region 514, connection terminal 584 and 586 to which the bias voltage is to be supplied from the voltage bias circuit 572 as well as a connection terminal 585 that gives the ground voltage are arranged. Note that connection relationships among the individual pads, the second shunt elements, and the connection terminals in the second region 514 are also the same as the connection relationships described in the third embodiment.

Thus, the substrate 50 has a configuration in which the chip 51 is placed between the first region 513 and the second region 514. In this configuration, between the pad 541 and the pad 544, between the pad 542 and the pad 545, or between the pad 543 and the pad 546, the antenna array 52 is placed. In addition, between the resistance elements 551 and 553 and the capacitance elements 552 and 554 and between the resistance elements 555 and 557 and the capacitance elements 556 and 558, the chip 51 is placed. As a result, the pads and the second shunt elements are arranged symmetrically with respect to the axis passing through the center of the antenna array 52. Examples of the axis passing through the center of the antenna array 52 include the axis CX extending in the direction perpendicular to the top surface of the substrate 50 and an axis extending in a direction parallel to the top surface of the substrate 50. Symmetricity is determined herein on the basis of the axis extending in the direction parallel to the top surface of the substrate. Therefore, in the substrate 50, the plurality of pairs of the first shunts and the second shunt elements which are connected to each other are arranged, and at least two of the pairs of the first shunt elements and the second shunt elements are arranged at positions symmetrical to each other with respect to the axis passing through the center of the antenna array. This improves a directionality of a terahertz wave generated from the antenna array 52 and enhances a frontal intensity of the terahertz wave.

In addition, by supplying the bias voltage from the two facing sides 511 and 512 of the chip 51, the impedance of the wiring that supplies the bias voltage decreases, and accordingly a voltage drop is reduced. Consequently, antenna-to-antenna variation in the bias voltage to be applied to the negative differential resistance element of each of the antennas decreases to improve uniformities of antenna outputs.

In addition, the resistance element 551 and the capacitance element 552 and the resistance element 553 and the capacitance element 554, which are included in the second shunt element, are connected in parallel. Likewise, the resistance element 555 and the capacitance element 556 and the resistance element 557 and the capacitance element 558, which are included in the second shunt element, are connected in parallel. Accordingly, in the antenna device 500, the number of the resistance elements and the capacitance elements which are connected in parallel is larger than that in the antenna device 400. Therefore, it is possible to further reduce the parasitic inductance included in the resistance elements and the capacitance elements and suppress the parasitic oscillation.

Moreover, since the wiring placed in the substrate 50 also has a resistance value, as each of the resistance elements 551, 553, 555, and 557, a resistance of the wiring may also be used, and the number of components to be placed over the substrate 50 can thus be reduced, which is advantageous for a size reduction.

Figure 14:
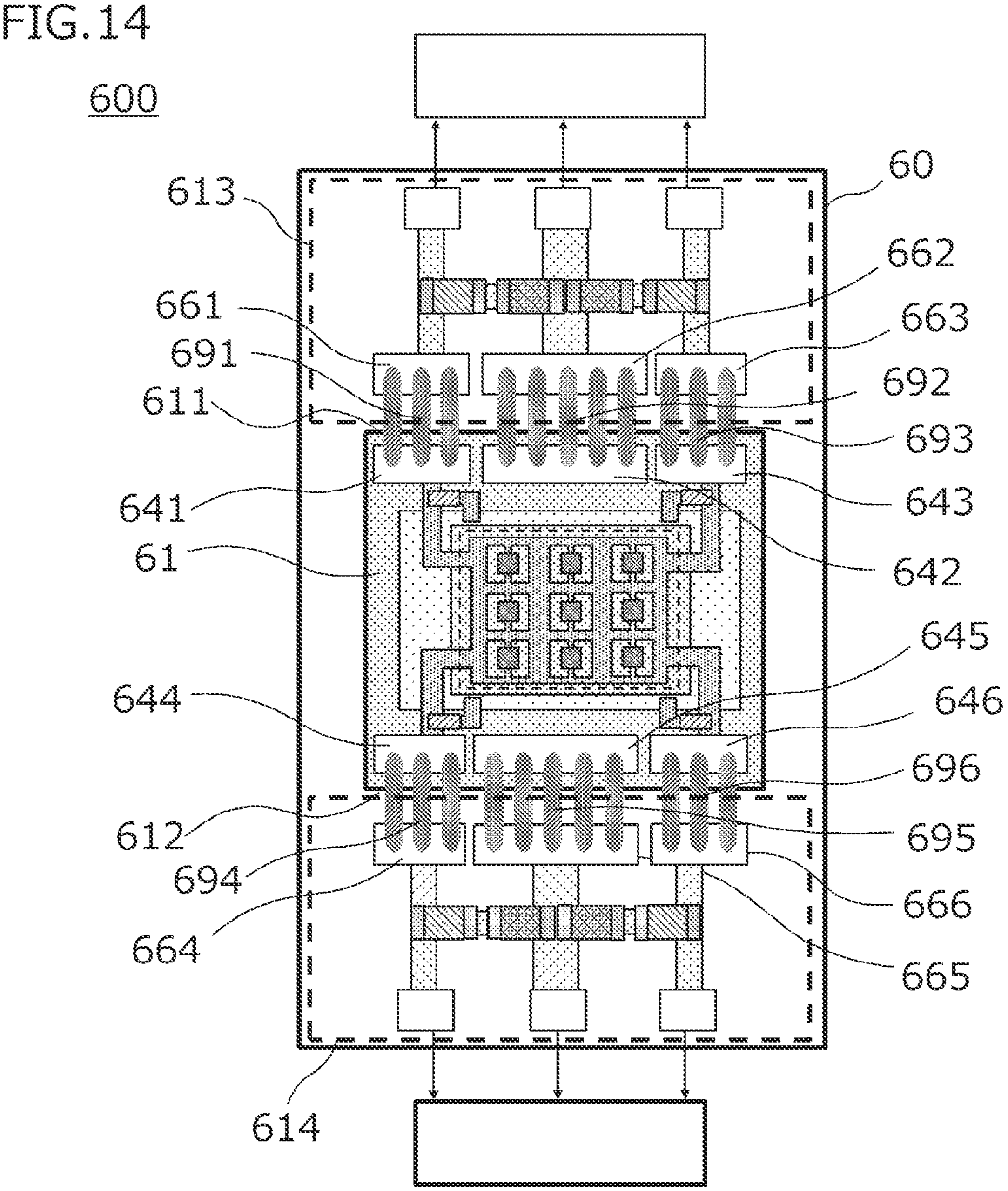
FIG. 14 illustrates an example of the plan view of the antenna device according to the fourth embodiment.

FIG. 14 is a diagram illustrating an antenna device according to a modification of the present embodiment. A configuration of an antenna device 600 illustrated in FIG. 14 corresponds to a configuration obtained by further applying characteristic features of the second embodiment to the configuration of the antenna device 500 illustrated in FIG. 13. Accordingly, the antenna device according to the present modification is characterized in that the number of the bonding wires providing connection between the pads in the antenna device described above is different. In the configuration of the antenna device illustrated in FIG. 14, a description of the same components as those of the antenna device 500 illustrated in FIG. 13 is omitted.

As illustrated in FIG. 14, in the antenna device 600, on a side of a top surface of a chip 61 on which a first side 611 of the chip 61 is present, pads 641, 642, and 643 are arranged. In addition, on a side of the chip 61 on which a second side 612 thereof facing the first side 611 is present, pads 644, 645, and 646 are arranged.

In a substrate 60, in a first region 613 (region surrounded by a dotted line in the figure) present on the side of the chip 61 with the first side 611, pads 661, 662, and 663 are arranged, in the same manner as in the configuration illustrated in FIG. 13. Meanwhile, in a second region 614 (region surrounded by a dotted line in the figure) of the chip 61 present on the side with the second side 612, pads 664, 665, and 666 are arranged.

The pad 641 and the pad 661 are connected with a plurality of bonding wires 691, the pad 642 and the pad 662 are connected with a plurality of bonding wires 692, and the pad 643 and the pad 663 are connected with a plurality of bonding wires 693. Meanwhile, the pad 644 and the pad 664 are connected with a plurality of bonding wires 694, the pad 645 and the pad 665 are connected with a plurality of bonding wires 695, and the pad 646 and the pad 666 are connected with a plurality of bonding wires 696.

In the present modification also, in the same manner as in the second embodiment, by electrically connecting the plurality of bonding wires in parallel, it is possible to reduce a combined inductance of the bonding wires, and suppress parasitic oscillation.

Fifth Embodiment

Next, using FIGS. 15 and 16, a description will be given of an antenna device according to the fifth embodiment of the present disclosure. The antenna device according to the fifth embodiment is characterized in that pads are arranged in the vicinity of individual sides of a chip. In the present embodiment, a description of the same components as those in the other embodiments is omitted.

Figure 15:
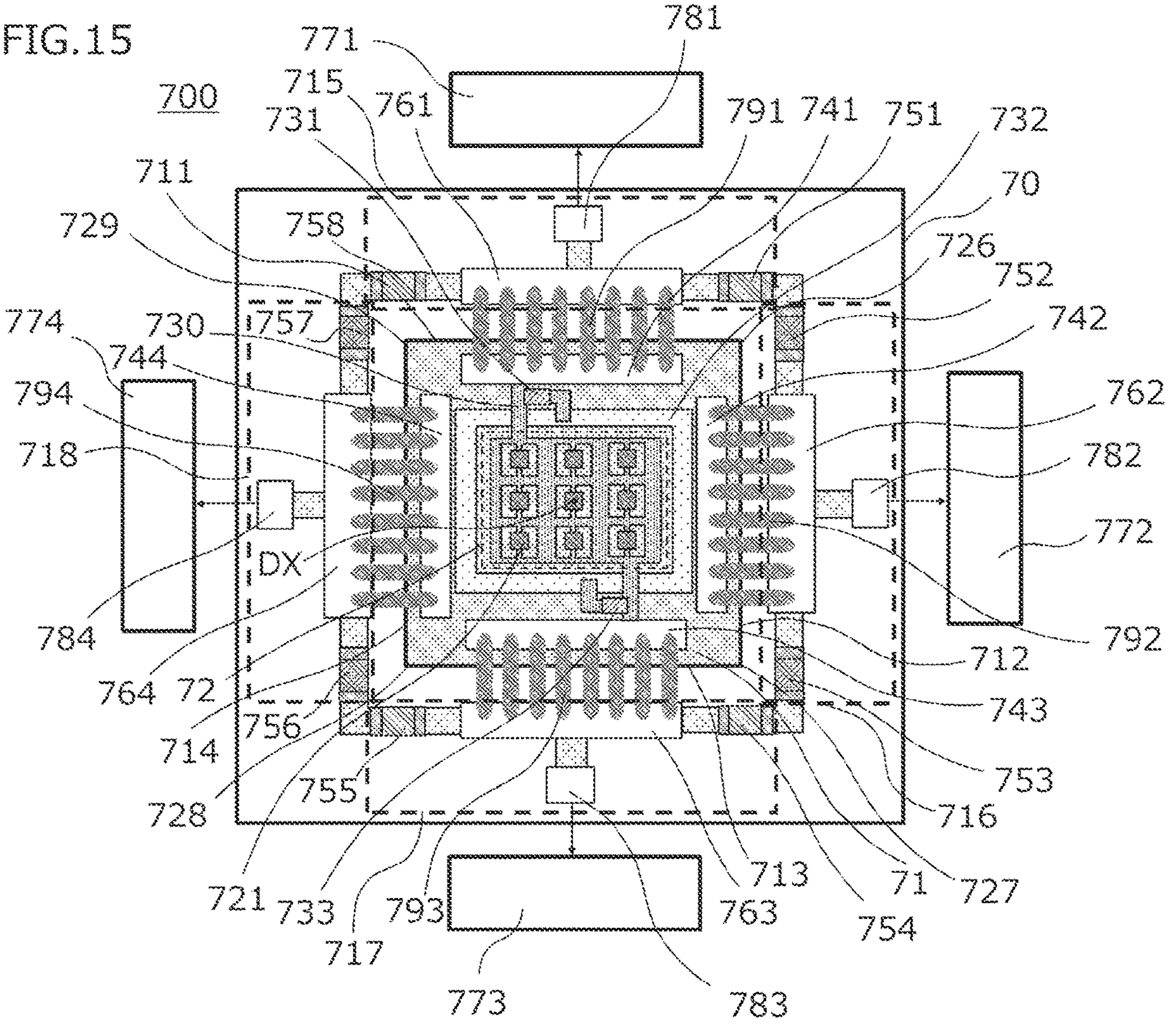
FIG. 15 illustrates an example of a plan view of an antenna device according to a fifth embodiment.

In an antenna device 700 according to the present embodiment illustrated in FIG. 15, a chip 71 includes pads 741 and 743 for applying a bias voltage and a pad 742 that applies a ground voltage. The antenna device 700 further includes the pad 741 for applying the bias voltage and the pad 742 that applies the ground voltage.

In the antenna device 700 according to the present embodiment, on the chip 71, the pad 741 is placed in the vicinity of a first side 711, while the pad 742 is placed in the vicinity of a second side 712. Also, on the chip 71, the pad 743 is placed in the vicinity of a third side 713 facing the first side 711, while a pad 744 is placed in the vicinity of a fourth side 714 facing the second side 712. To each of the pad 741 and the pad 743, the bias voltage is applied while, to each of the pad 742 and the pad 744, the ground voltage is applied. The pads 741, 742, 743, and 744 are arranged around an antenna array 72 so as to surround the antenna array 72.

In the chip 71, resistance elements 731 and 733 and a capacitance element 732, which are included in a first shunt element, are arranged. One terminal of the resistance element 731 and one terminal of the resistance element 733 are connected to one terminal of the capacitance element 732 via wiring and vias (not shown). Preferably, the resistance element 731 and the resistance element 733 are arranged adjacent to the capacitance element 732. Alternatively, the resistance element 731 may also be placed on the capacitance element 732 in overlapping relation thereto. Another terminal of the resistance element 731 is connected to the pad 741 via a bias voltage line 730, while another terminal of the resistance element 733 is connected to the pad 743 via the bias voltage line 730. The bias voltage line 730 is placed also between the individual antennas 721 in the antenna array 72 to be connected commonly to the individual antennas 721, and the bias voltage is applied. Another terminal of the capacitor 732 is connected to each of the pad 742 and the pad 744 via wiring and a via (not shown).

In a substrate 70, in a first region 715 present on a side of the chip 71 with the first side 711, a resistance element 751 and a capacitance element 758 which are included in a second shunt element and a pad 761 to be connected to the pad 741 of the chip 71 with a bonding wire 791 are arranged. In addition, in the first region 715, a connection terminal 781 to which the bias voltage is to be supplied from a voltage bias circuit 771 is placed. One terminal of the resistance element 751 and one terminal of the capacitance element 758 are connected to the pad 761, and the pad 761 is connected to the connection terminal 781.

Likewise, in a second region 716 present on a side of the chip 71 with the second side 712, a capacitance element 752 and a resistance element 753, which are included in the second shunt element, and a pad 762 to be connected to the pad 742 of the chip 71 with a bonding wire 792 are arranged. In addition, in the second region 716, a connection terminal 782 to which the ground voltage is to be supplied from a voltage bias circuit 772 is placed. One terminal of the capacitance element 752 and one terminal of the resistance element 753 are connected to the pad 762, and the pad 762 is connected to the connection terminal 782.

Likewise, in a third region 717 present on a side of the chip 71 with the third side 713, a capacitance element 754 and a resistance element 755, which are included in the second shunt element, and a pad 763 to be connected to the pad 743 of the chip 71 with a bonding wire 793 are arranged. In addition, in the third region 717, a connection terminal 783 to which the bias voltage is to be supplied from a voltage bias circuit 773 is placed. One terminal of the capacitance element 754 and one terminal of the resistance element 755 are connected to the pad 763, and the pad 763 is connected to the connection terminal 783.

Likewise, in a fourth region 718 present on a side of the chip 71 with the fourth side 714, a capacitance element 756 and a resistance element 757, which are included in the second shunt element, and a pad 764 to be connected to the pad 744 of the chip 71 with a bonding wire 794 are arranged. In addition, in the fourth region 718, a connection terminal 784 to which the ground voltage is to be supplied from a voltage bias circuit 774 is placed. One terminal of the capacitance element 756 and one terminal of the resistance element 757 are connected to the pad 764, and the pad 764 is connected to the connection terminal 784.

In the vicinity of a first corner 726 formed between the first side 711 and the second side 712 of the chip 71, the resistance element 751 and the capacitance element 752 are arranged, and another terminal of the resistance element 751 and another terminal of the capacitance element 752 are connected. Meanwhile, in the vicinity of a second corner 727 formed between the second side 712 and the third side 713 of the chip 71, the resistance element 753 and the capacitance element 754 are arranged, and another terminal of the resistance element 753 and another terminal of the capacitance element 754 are connected. In addition, in the vicinity of a third corner 728 formed between the third side 713 and the fourth side 714 of the chip 71, the resistance element 755 and the capacitance element 756 are arranged, and another terminal of the resistance element 755 and another terminal of the capacitance element 756 are connected. Meanwhile, in the vicinity of a fourth corner 729 formed between the fourth side 714 and the first side 711 of the chip 71, the resistance element 757 and the capacitance element 758 are arranged, and another terminal of the resistance element 757 and another terminal of the capacitance element 758 are connected.

Through connection relationships between the resistance elements and the capacitance elements, the resistance elements 751 and the capacitance element 752, the resistance element 753 and the capacitance element 754, the resistance element 755 and the capacitance element 756, and the resistance element 757 and the capacitance element 758, which are included in the second shunt elements, are electrically connected in parallel to each other. This can further reduce the parasitic inductance included in each of the elements and suppress the parasitic oscillation.

In FIG. 15, the voltage bias circuits 771, 772, 773, and 774 are provided as the separate circuits, but the substrate 70 may also be configured such that the bias voltage and the ground voltage are supplied by one voltage bias circuit.

Also, in FIG. 15, the resistance element 751 and the capacitance element 752 each included in the second shunt element are arranged such that a direction in which the two terminals of the resistance element 751 are arranged and a direction in which the two terminals of the capacitance element 752 are arranged are perpendicular to each other. In addition, the resistance element 753 and the capacitance element 754, the resistance element 755 and the capacitance element 756, and the resistance element 757 and the capacitance element 758 are also configured to be similarly arranged.

Moreover, since the wiring placed in the substrate 70 also has a resistance value, as each of the resistance elements 751, 753, 755, and 757, a resistance of the wiring may also be used, and the number of components to be placed over the substrate 70 can thus be reduced, which is advantageous for a size reduction.

Thus, in the present embodiment, on the sides of the chip 71 on which the four individual sides are present, the respective pads are arranged, and the bias voltage or the ground voltage is supplied from each of the sides. In other words, this configuration is as follows. In a direction along a line segment connecting the two facing sides, the pad, the chip 71, and the pad are arranged in this order while, in a direction along a line segment connecting other facing two sides, the pad, the chip 71, and the pad are arranged in this order. The direction along the line segment connecting the two facing sides and the direction along the line segment connecting the other two facing sides cross each other. Due to the configuration in the present embodiment, the impedance of the wiring that supplies the bias voltage becomes smaller than that in a case where the bias voltage or the ground voltage is supplied from the side of the chip 71 on which any one or two of the sides are present, and accordingly the voltage drive decreases. Consequently, antenna-to-antenna variation in the bias voltage to be applied to the negative differential resistance element of each of the antennas decreases to improve uniformities of antenna outputs.

In addition, since the pads are arranged on the sides of the chip 71 on which the individual sides are present, it is possible to electrically connect the plurality of bonding wires in parallel, while increasing sizes of the pads. This can reduce the combined inductance of the bonding wires and further suppress the parasitic oscillation.

Additionally, by arranging, over the substrate 70, the resistance elements and the capacitance elements of the second shunt elements in the vicinities of the four corners 726 to 729 of the chip 71, it is possible to effectively use the space of the substrate, reduce a substrate size, and thereby reduce manufacturing cost.

The pads and the second shunt elements are arranged symmetrically with respect to an axis passing through a center of the antenna array 72. Examples of the axis passing through the center of the antenna array 72 include an axis DX extending in a direction perpendicular to a top surface of the substrate 70 and an axis extending in a direction parallel to the top surface of the substrate 70. Symmetricity is determined herein on the basis of the axis extending in the direction parallel to the top surface of the substrate. Therefore, on the substrate 70, the plurality of pairs of the first shunts and the second shunt elements which are connected to each other are arranged, and at least two of the pairs of the first shunt elements and the second shunt elements are arranged at positions symmetrical to each other with respect to the axis passing through the center of the antenna array. This improves a directionality of a terahertz wave generated from the antenna array 72 and enhances a frontal intensity of the terahertz wave.

Figure 16:
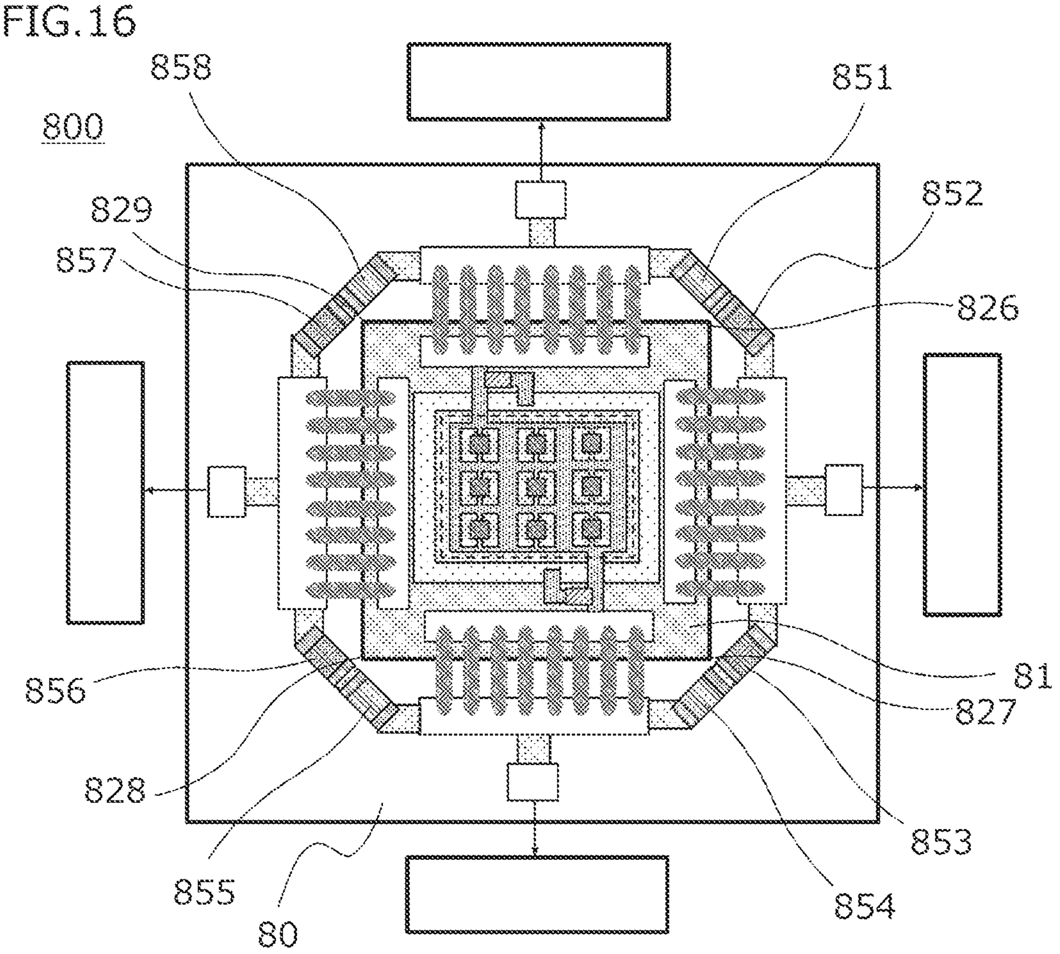
FIG. 16 illustrates an example of the plan view of the antenna device according to the fifth embodiment.

FIG. 16 is a diagram illustrating an antenna device according to a modification of the present embodiment. In the present modification, a description of the same components as those in the embodiments described above is omitted. In an antenna device 800 illustrated in FIG. 16, in the vicinities of individual corners 826 to 829 of a chip 81, a resistance element 851 and a capacitance element 852, a resistance element 853 and a capacitance element 854, a resistance element 855 and a capacitance element 856, and a resistance element 857 and a capacitance element 858 are arranged. In addition, the resistance elements 851, 853, 855, and 857 and the capacitance elements 852, 854, 856, and 858 are arranged obliquely to respective directions in which individual sides of the chip extend. Moreover, a direction in which two terminals of the resistance element 851 are arranged is the same as a direction in which two terminals of the capacitance element 852 are arranged, and the resistance element 853 and the capacitance element 854, the resistance element 855 and the capacitance element 856, and the resistance element 857 and the capacitance element 858 are similarly arranged.

Since the individual elements are thus arranged, it is possible to shorten wiring connecting the resistance elements, the capacitance elements, and the pads, reduce parasitic inductance included in the wiring, and suppress parasitic oscillation.

Sixth Embodiment

Next, using FIGS. 17 to 22, a description will be given of an antenna array in an antenna device according to the sixth embodiment of the present disclosure. In the present embodiment, a description of the same components as those in the other embodiments is omitted.

Figure 17:
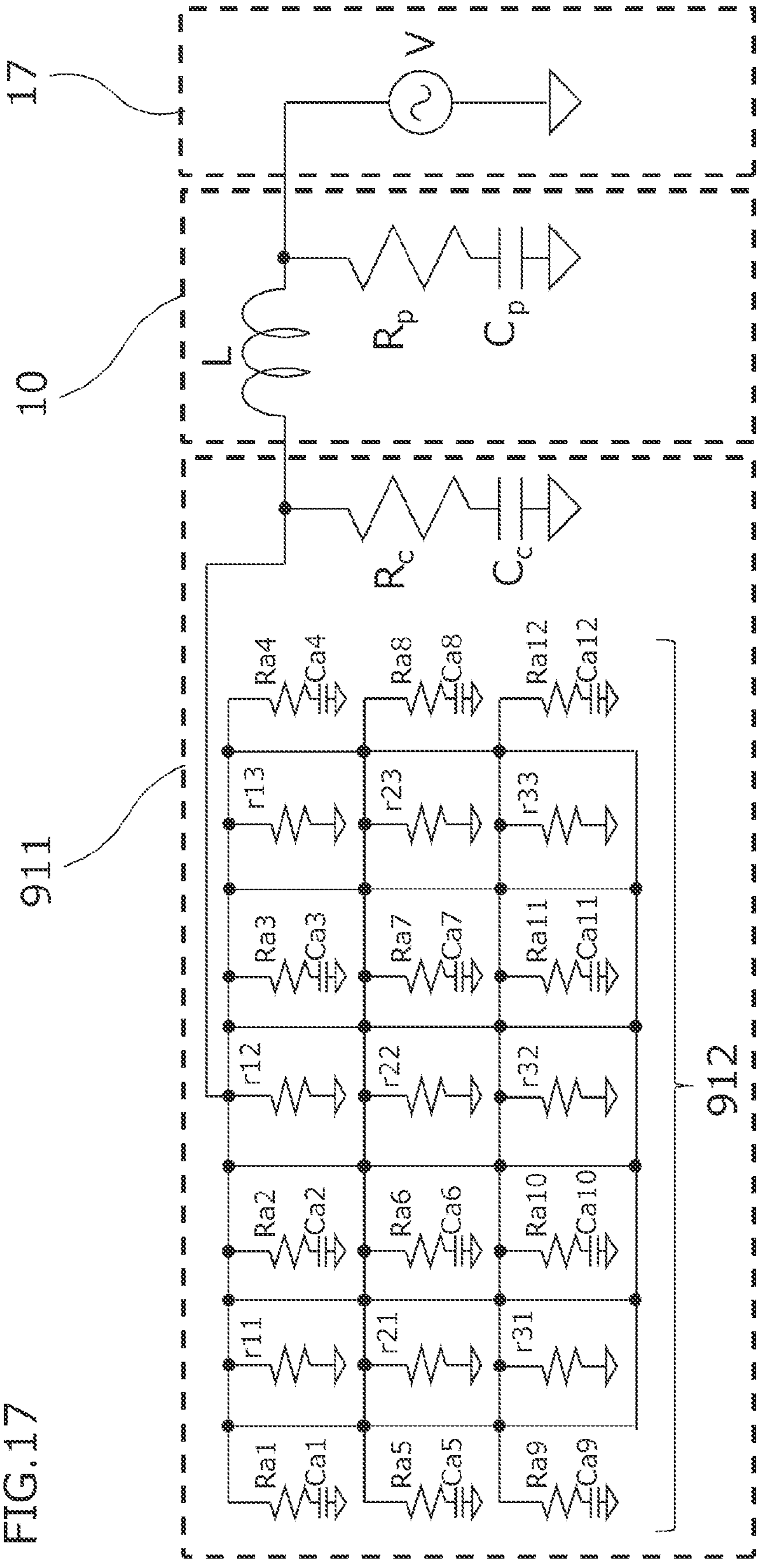
FIG. 17 illustrates an equivalent circuit diagram of an antenna device according to a sixth embodiment.

FIG. 17 illustrates an equivalent circuit diagram of an antenna device 900 according to the present embodiment. An example of a configuration of the equivalent circuit diagram illustrated in FIG. 17 corresponds to the configuration in the equivalent circuit diagram of the antenna device 100 according to the first embodiment illustrated in FIG. 5, in which the antennas 121 in the antenna array 12 are arranged in a 3×3 matrix configuration. An antenna array 912 has 3×3 negative differential resistance elements r11, r12, r13, r21, r22, r23, r31, r32, and r33, resistance elements Rai (i=1, 2, 3, . . . , 12), and capacitance elements Cai (i=1, 2, 3, . . . , 12). In the antenna array 912, the negative differential resistance elements and a plurality of third shunt elements in which the resistance elements and the capacitance elements are connected in series are configured. In addition, the 3×3 negative differential resistance elements and the plurality of third shunt elements are configured to be connected in parallel to each other. One terminals of the negative differential resistance elements, one terminals of the resistance elements Rai in the plurality of third shunt elements, and one terminal of the resistance element Rc of a first shunt element are commonly connected. Meanwhile, other terminals of the resistance elements Rai are connected to one terminals of the capacitance elements Cai. Moreover, other terminals of the negative differential resistance elements and other terminals of the capacitance elements Cai in the plurality of third shunt elements are connected to a ground potential. The other components of the antenna array 912 are the same as those in FIG. 5, and therefore a description thereof is omitted herein.

In the antenna array 912, a combined resistance of the 3×3 negative differential resistance elements r11, r12, r13, r21, r22, r23, r31, r32, and r33 corresponds to the resistance r illustrated in FIG. 5. Meanwhile, a combined impedance of parasitic impedances of the third shunt elements and wiring corresponds to the impedance Z illustrated in FIG. 5.

Figure 18:
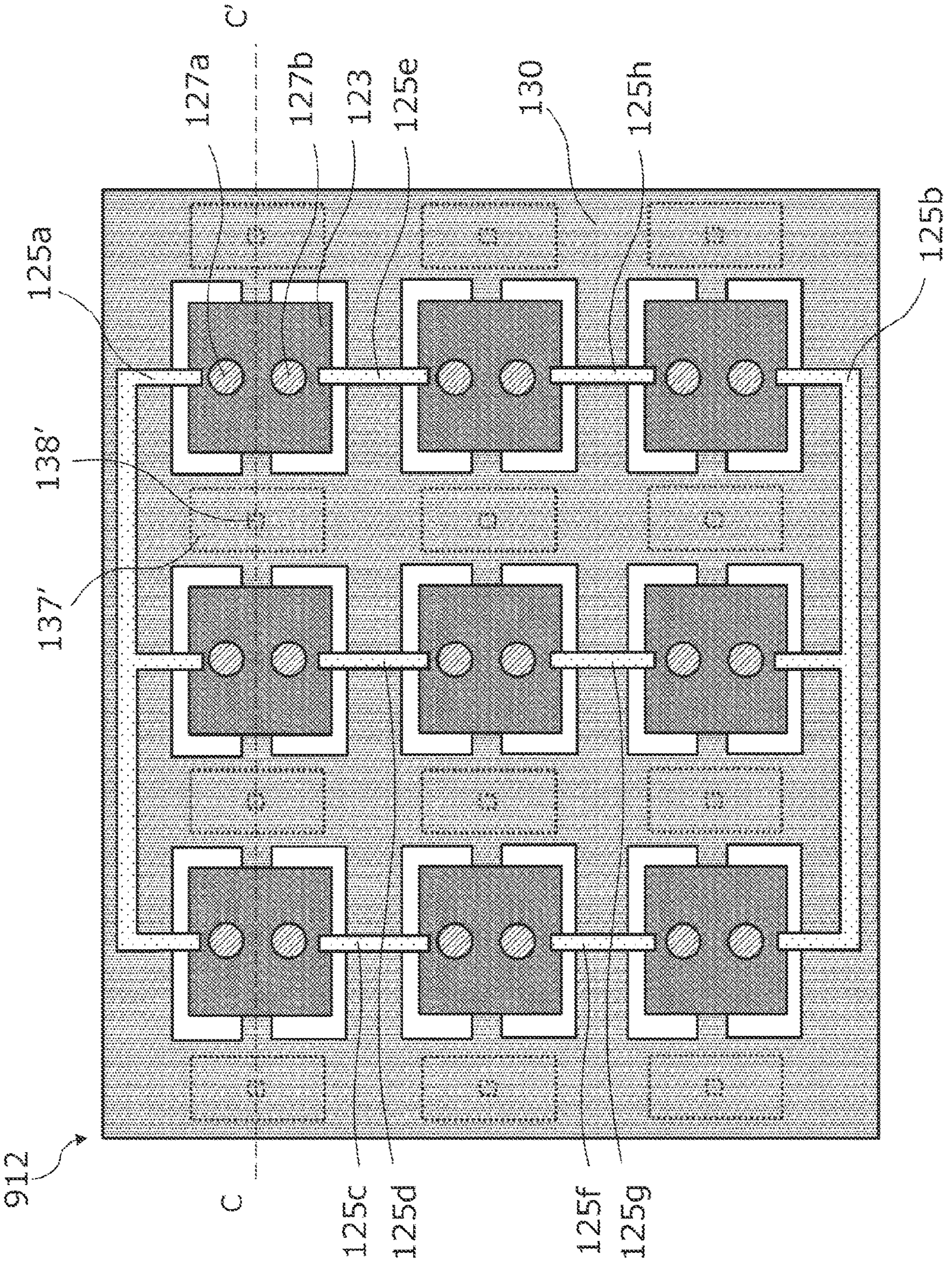
FIG. 18 is an illustrative view illustrating an antenna array according to the sixth embodiment.
Figure 19:
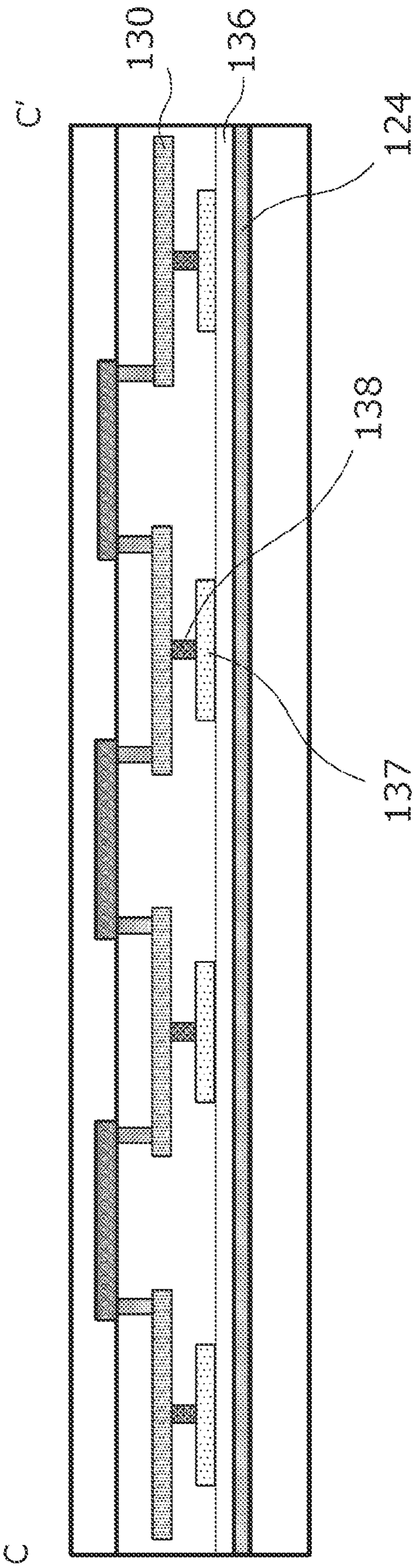
FIG. 19 illustrates an example of a cross-sectional view of the antenna device according to the sixth embodiment.

FIG. 18 is an example of a top view of the antenna array 912 disposed in a 3×3 matrix configuration corresponding to the equivalent circuit diagram of FIG. 17. FIG. 19 is a cross-sectional view along a line C-C' in FIG. 18. A description of the configuration described using FIG. 4 is omitted, and the same components as those in FIG. 4 are denoted by the same reference signs. As described using FIG. 4, the adjacent antennas are coupled to each other via microstrip lines 125*a* to 125*h*, and are in mutual injection locking (mutually synchronized) at an oscillation frequency fTHz of a terahertz wave. FIG. 18 illustrates an example of a configuration in which one antenna includes two negative differential resistance elements 127*a* and 127*b*. In order to improve a directionality of the terahertz wave, the two negative differential resistance elements 127*a* and 127*b* are preferably symmetrically arranged with respect to a line passing through a center of the one antenna.

To suppress parasitic oscillation in a frequency band lower than the oscillation frequency fTHz, the bias voltage line 130 is provided with the third shunt elements. The third shunt elements are arranged in parallel to the negative differential resistance elements to provide a structure in which a short circuit is caused in a frequency band lower than fTHz to suppress the parasitic oscillation. Each of the third shunt elements has a structure in which the resistance element or an element obtained by connecting a resistance and a capacitance in series is placed in parallel to the negative differential resistance element. In the third shunt element, values of the resistance and the capacitance are such that an impedance of the element is equal to or slightly lower than an absolute value of a combined negative differential resistance of the plurality of negative differential resistance elements arranged adjacent thereto.

In FIG. 18, in a region surrounded by a broken line 137' in plan view, a conductor layer 137 serving as one electrode of the capacitance element included in the third shunt element is placed. Meanwhile, in a region surrounded by a broken line 138', a resistor 138 serving as the resistance element is placed. The conductor layer 137 and the resistor 138 are placed in a layer underlying a wiring layer forming the bias voltage line 130. The third shunt elements are arranged around the individual antennas. To the metal layer 123 forming a part of each of the antennas, the bias voltage line 130 is connected to supply a bias voltage, and each of the third shunt elements is preferably placed in the vicinity of a connection portion thereof, and may appropriately be placed between the antenna and the antenna. Such placement allows a configuration in which one of the third shunt elements is shared by the two antennas adjacent thereto. As a result, a layout efficiency improves to allow a chip size reduction and, since flexibility of size adjustment of the capacitance and resistance of the shunt element increases, the parasitic oscillation is easily suppressed.

As illustrated in a cross-sectional view of FIG. 19, on the grounded metal layer 124, a dielectric layer 136 is placed. Note that, since the dielectric layer 136 is used as a dielectric material of the capacitors of the third shunt elements, it is preferable to use a silicon nitride ($\varepsilon$=7) having a relatively high dielectric constant for a size reduction of a MIM capacitor structure.

Additionally, on the dielectric layer 136, the conductor layer 137 is stacked. Thus, in the antenna array 912, a metal-insulator-metal (MIM) capacitor structure in which the grounded metal layer 124, the dielectric layer 136, and the conductor layer 137 are stacked in this order is formed, which corresponds to the capacitance element of each of the third shunt elements. This capacitance element is placed in a layer underlying the bias voltage line 130 placed between the antenna and the antenna. The conductor layer 137 is placed in a layer between the bias voltage line 130 and the grounded metal layer 124. To the conductor layer 137, the resistor 138 is connected, and the resistor 138 is connected to the bias voltage line 130. This resistor 138 corresponds to the resistance element of each of the third shunt elements.

Thus, in the present embodiment, the grounded metal layer 124 and the bias voltage line 130 are electrically connected via the capacitance element and the resistance element each included in the third shunt element. A plurality of the third shunt elements are arranged in an array antenna in such a manner as to be connected to the bias voltage line 130 at respective portions between the antenna and the antenna. In the present embodiment, the third shunt elements are connected to the grounded metal layer 124, but need only to be connected to a conductive layer at a fixed potential, and may also be connected to another conductive layer.

Note that a configuration in which the third shunt elements are placed at nodes of a high-frequency electric field at the oscillation frequency fTHz which is standing in the antennas is a configuration having a high impedance at the frequency fTHz and more appropriate to selectively oscillate only the high frequency at the frequency fTHz. However, there is a risk that, as a result of an increased number of arrays and sharing of the bias voltage line in the antenna array, unexpected low-frequency multi-mode oscillation occurs. Accordingly, in the present embodiment, the bias voltage line 130 in the array antenna is configured to be set to an impedance lower than that of the negative resistance element in a frequency band lower than the oscillation frequency fTHz. This can suppress oscillation in another mode even when the number of the arrays in the antenna array increases and allow stable single-frequency oscillation in a terahertz band to be obtained. In the third shunt element, particularly at 10 GHz or higher, parasitic oscillation in a frequency band less than the frequency fTHz can effectively be suppressed.

Figure 20:
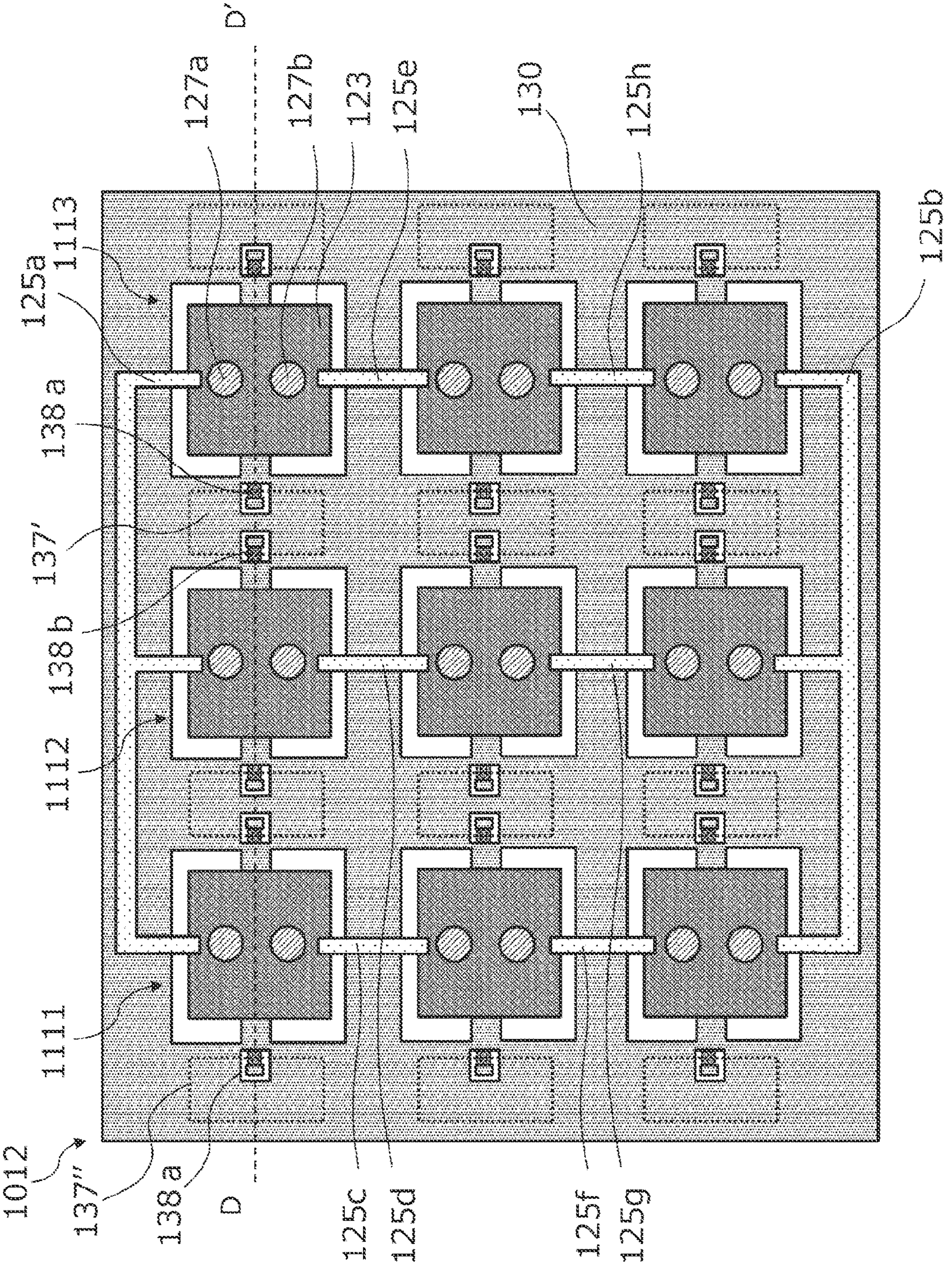
FIG. 20 is an illustrative view illustrating an antenna array according to a modification of the sixth embodiment.
Figure 21:
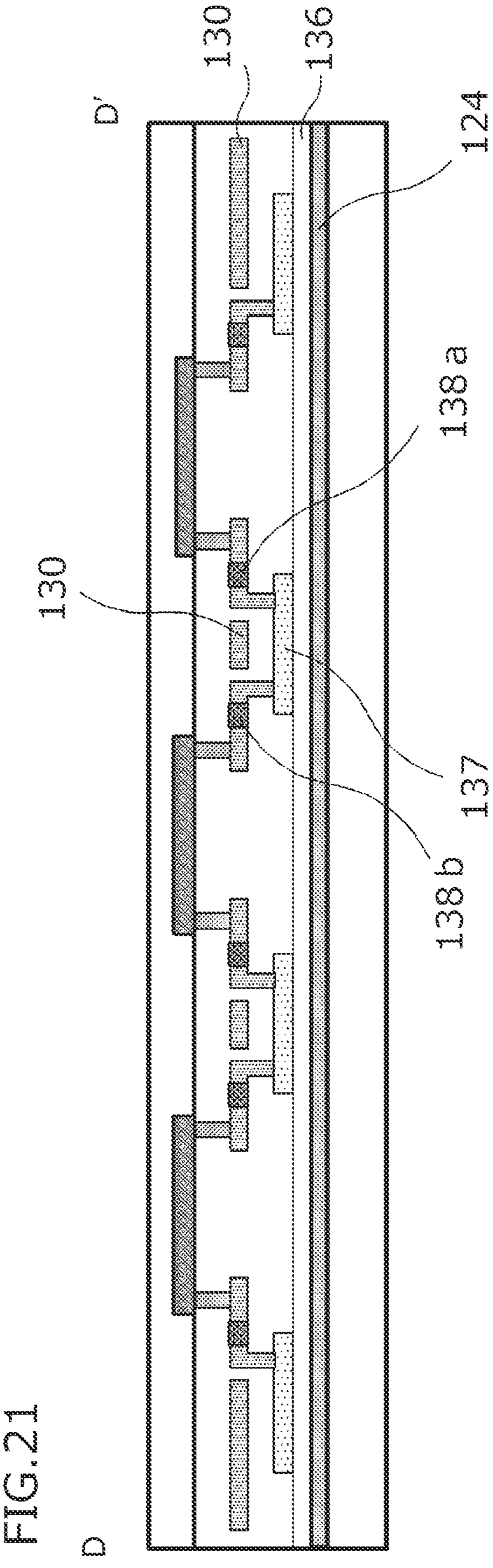
FIG. 21 illustrates an example of a cross-sectional view of an antenna device according to the modification of the sixth embodiment.

FIG. 20 is a top view of an antenna array 1012 as a modification of the antenna array 912 illustrated in FIG. 18, and FIG. 21 is a cross-sectional view along a line D-D' in FIG. 20. For the same components as those in FIGS. 18 and 19, the same reference signs are used, and a description thereof is omitted. The antenna array 1012 is different from the antenna array 912 illustrated in FIGS. 18 and 19 in that each of the resistance elements included in the third shunt elements incudes a resistor 138*a* and a resistor 138*b*.

As illustrated in FIG. 20, in the antenna array 1012, the resistor 138*a* and the resistor 138*b* are arranged between an antenna 1112 and an antenna 1113. These two resistors 138*a* and 138*b* correspond to the resistance elements of each of the third shunt elements, and are connected in parallel to be connected in series to the capacitance element. The resistance elements 138_a_ and 138_b_ are arranged in the vicinities of connection portions between the antennas 1112 and 1113 and the bias voltage line 130, and are arranged in a space resulting from patterning and removal of the wiring layer forming the bias voltage line 130.

As illustrated in a cross-sectional view of FIG. 21, each of the resistor 138_a_ and the resistor 138_b_ is placed at the same height as that of the bias voltage line 130. One end portions of the resistor 138_a_ and the resistor 138_b_ are connected to the bias voltage line 130, while other end portions thereof are connected to the conductor layer 137 by using the same wiring layer as that of the bias voltage line 130.

The third shunt element placed in a region 137" which is not interposed between an antenna 1111 at an end portion of the antenna array 1012 and another antenna may also be configured such that, as the resistance element, either one (138_a_ in the figure) of the resistor 138_a_ and the resistor 138_b_ is placed.

A configuration of the antenna array 1012 illustrated in FIGS. 20 and 21 needs only to be such that, at positions at which the resistor 138_a_ and the resistor 138_b_ are placed, the wiring layer forming the bias voltage line 130 is removed by patterning, and a material forming the resistors is formed in the resulting space. As a result, fabrication becomes easier than that of a conventional antenna array, and occurrence of a defect can also be suppressed.

Figure 22:
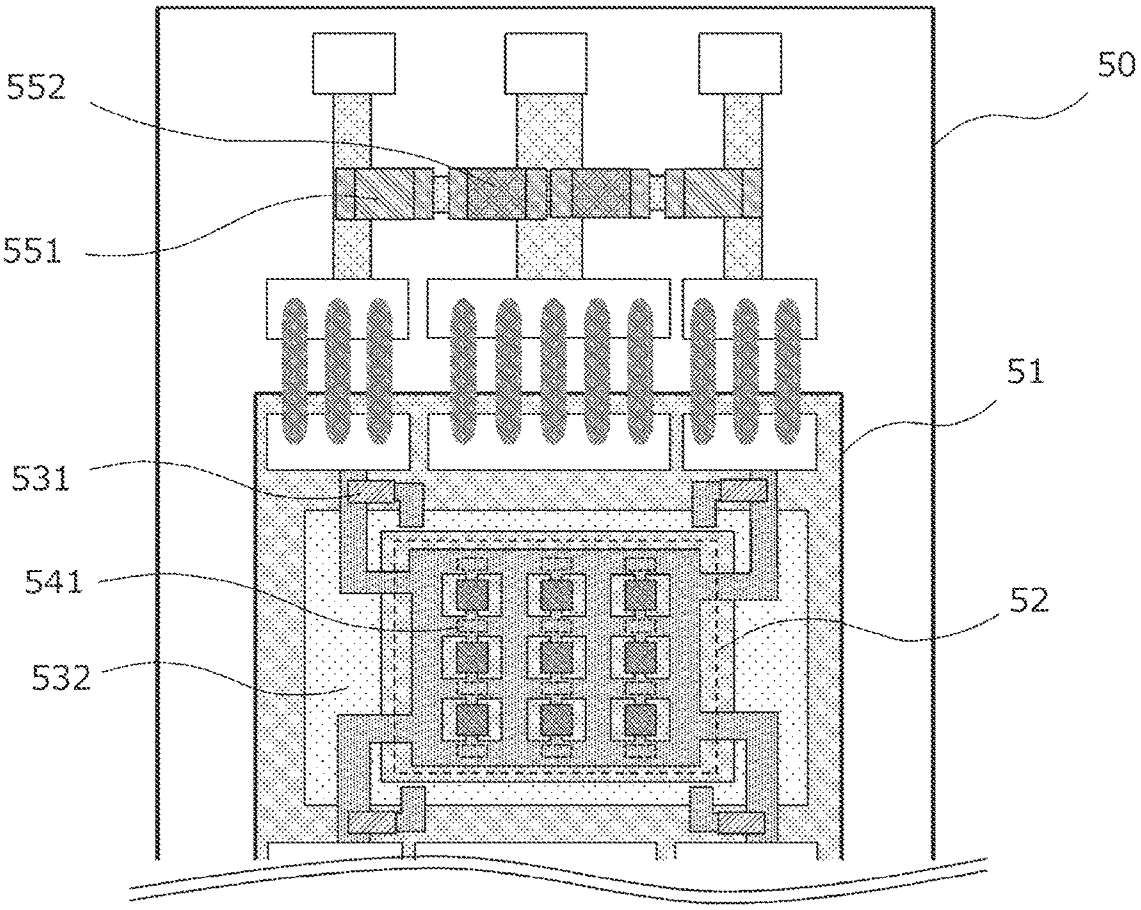
FIG. 22 illustrates an example of the plan view of the antenna device according to the fourth embodiment.

Using FIG. 22, an additional description will be given herein of the first shunt elements, the second shunt elements, and the third shunt elements. FIG. 22 illustrates an example of the configuration in which the pads are arranged along the two facing sides of the chip described in the fourth embodiment, and the pad and the pad are connected with a plurality of bonding wires. Note that, in the following description, the same components as the components described in the fourth embodiment are denoted by the same reference signs, and a detailed description thereof is omitted.

Each of the first shunt elements includes the resistance element 531 and the capacitance element 532, and is placed around the antenna array 52 in the chip 51. As the capacitance element 532, a MIM capacitor is appropriate.

Each of the second shunt elements includes the resistance element 551 and the capacitance element 552, and is placed on the substrate 50 on which the chip 51 is to be mounted. As the resistance element 551 and the capacitance element 552, surface mount components (SMD) are used appropriately and, as the capacitance element 552, e.g., a ceramic capacitor is used.

Each of the third shunt elements includes a resistance element (not shown) and the capacitance element 541, and is placed in the chip 51 similarly to the first shunt elements to be placed in the antenna array 52. As the capacitance element 541, a MIM capacitor is appropriate.

Areas of the respective capacitance elements included in the three shunt elements or magnitudes of capacitance values thereof are preferably set larger in order of the third shunt element, the first shunt element, and the second shunt element (Capacitance Element 541<Capacitance Element 532<Capacitance Element 552). An appropriate arrangement can be made as long as the capacitance value of the capacitance element 541 is at least 1 pF and less than 100 pF, the capacitance value of the capacitance element 532 is at least 100 pF and less than 10 nF, and the capacitance value of the capacitance element 552 is at least 10 nF and less than 100 g. An appropriate arrangement can also be made as long as the resistance value of each of the first shunt element, the second shunt element, and the third shunt element is at least 0.01Ω and less than 10Ω.

The number of the third shunt elements is determined according to the number of antennas in the antenna array 2, and is preferably the number of the first shunt elements or more and the number of the second shunt elements or more. This can suppress parasitic oscillation and improve an output.

In a case where the number of the antennas in the antenna array 2 is small for adjustment of an output to a low level or the like, the number of the third shunt elements may also be set smaller than the number of the first shunt elements and the number of the second shunt elements.

When the number of the second shunt elements is set to the number of the first shunt element or more, the number of the second shunt elements that are connected in parallel can be increased. As a result, it is possible to reduce the parasitic inductance of the SMDs, and thereby suppress parasitic oscillation. In addition, as a result of a reduction in the number of the first shunt elements, it is possible to reduce a chip area, which contributes to a reduction in the cost of the antenna array.

When the number of the second shunt elements is smaller than the number of the first shunt elements, the number of the SMDs included in the second shunt elements can be reduced. Since an area required to mount the SMDs on the substrate is relatively large, a reduction in the number of the SMDs allows a substrate size to be reduced, which contributes to a reduction in the cost of the antenna array.

As resistors forming the resistance elements of the first shunt elements and the third shunt elements in the chip, Ta, Ti, Mo, Mn, Al, Ni, Nb, W, Ru, or the like can be used appropriately. Moreover, as the resistors, an alloy film, an oxide film, a nitride film, a silicide film, or the like thereof (e.g., TiW, TiN, TaN, WN, WSiN, TaSiN, NbN, MoN, MnO, or RuO) can be used appropriately. Furthermore, as the resistors, polysilicon, a diffusion resistance film obtained by doping Si with an impurity, or the like can be used appropriately.

As a material of the wiring and the conductive layers each used in the chip, a material having a resistivity of not more than $1\times10^{-6}$ Ω·m is preferable. Specifically, as the material, a metal or a metal compound such as Ag, Au, Cu, W, Ni, Cr, Ti, Al, an AuIn alloy, or TiN is used appropriately.

The dielectric layer included in the MIM capacitor is required to have an insulating property (property of behaving as an insulator/high resistor that does not conduct electricity against a dc voltage), a barrier property (property of preventing diffusion of a metal material used for an electrode), and a workability (property that allows working with submicron precision). As a specific example of a material satisfying the requirement, an inorganic insulator material such as a silicon dioxide ($\varepsilon$=4), a silicon nitride ($\varepsilon$=7), an aluminum oxide, or an aluminum nitride is used appropriately.

The negative resistance element includes an electrode and a semiconductor layer and, when the electrode is a conductor ohmic-connected to the semiconductor layer, the electrode is appropriate for reducing an ohmic loss or a RC delay resulting from a series resistance. In a case of using the electrode as an ohmic electrode, as a material thereof, e.g., Ti/Pd/Au, Ti/Pt/Au, AuGe/Ni/Au, TiW, Mo, ErAs, or the like is used appropriately.

Seventh Embodiment

Figure 23:
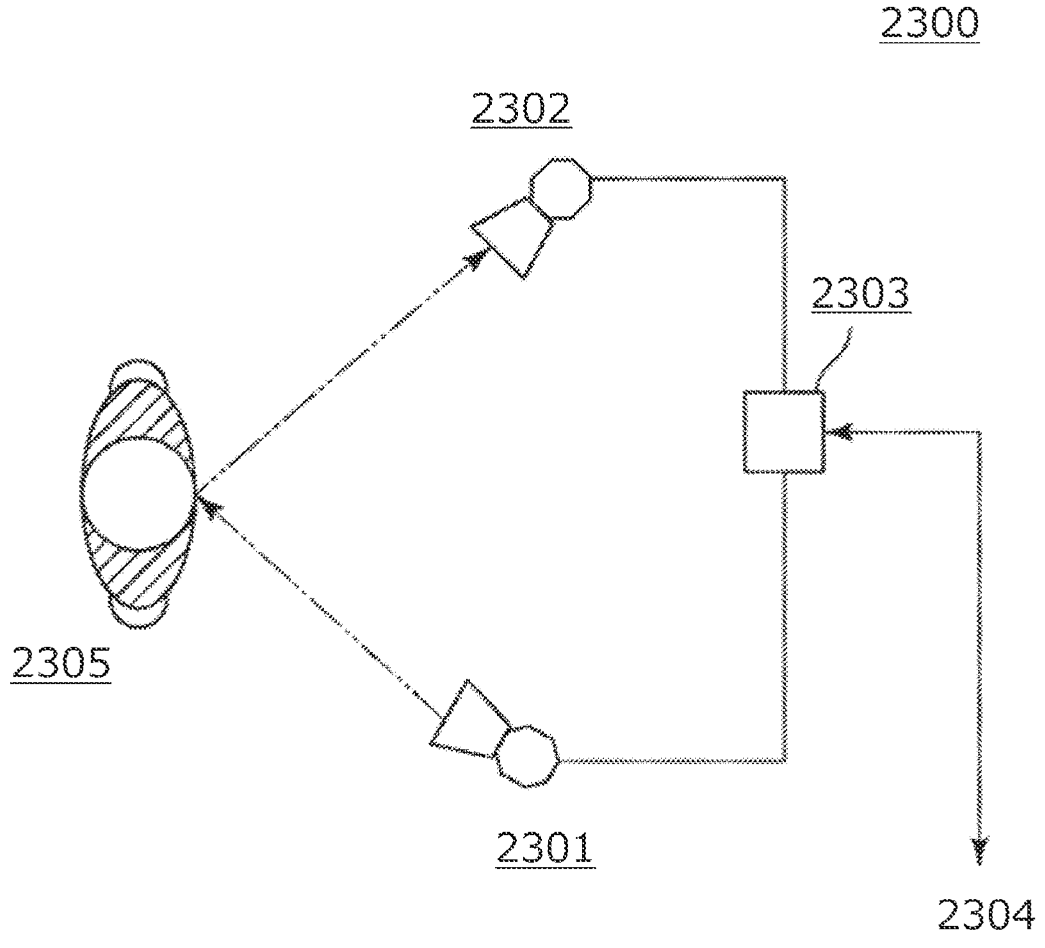
FIG. 23 illustrates a schematic diagram for illustrating a camera system according to a seventh embodiment.

Using FIG. 23, a description will be given of a detection system according to the present embodiment. The detection system may also be a system capable of photographing an image which is, e.g., a camera system. In the present embodiment, by way of example, the camera system will be described. FIG. 23 is a schematic diagram for illustrating a configuration of a camera system 2300 using a terahertz wave.

The camera system 2300 has an oscillation device 2301, a detection device 2302, and a processing unit 2303. To the oscillation device 2301, the antenna device described in each of the embodiments can be applied. The detection device 2302 can detect an electromagnetic wave transmitted from the antenna device, and may also be an antenna device using another semiconductor element such as, e.g., a Schottky barrier diode. The terahertz wave emitted from the oscillation device 2301 is reflected by a subject 2305 and detected by the detection device 2302. The processing unit 2303 processes a signal detected by the detection device 2302. Image data generated by the processing unit 2303 is output from the output unit 2304. Such a configuration allows a terahertz image to be acquired.

In the oscillation device 2301 and the detection device 2302, optical units may also be provided. Each of the optical units includes at least one material transparent to the terahertz wave such as polyethylene, Teflon (registered trademark), high-resistance silicon, or a polyolefin resin, and may also include a plurality of layers.

The camera system described in the present embodiment is only exemplary, and may also be in another form. In particular, information to be acquired by the system is not limited to the image information, and a detection system that performs signal detection may also be used.

Each of the embodiments only shows a specific example in implementing the present invention and, due to these, a technical scope of the present invention should not be construed limitative. In other words, the present invention can be implemented in various forms without departing from the technical scope or main features thereof.

With the technology of the present disclosure, it is possible to provide an antenna device and a camera system which excellently operate due to an optimized configuration of a shunt element and suppressed parasitic oscillation.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An antenna device transmitting or receiving an electromagnetic wave, the antenna device comprising:

an antenna array in which a plurality of antennas each including a negative differential resistance element and a resonance circuit are arranged;

a voltage bias circuit which applies a voltage to the antenna array;

a first shunt element which is connected between the antenna array and the voltage bias circuit in parallel relation to each of the negative differential resistance element and the voltage bias circuit, and in which a first resistor and a first capacitor of the first shunt element are connected in series; and a second shunt element which is connected between the first shunt element and the voltage bias circuit in parallel relation to each of the negative differential resistance element and the voltage bias circuit, and in which a second resistor and a second capacitor of the second shunt element are connected in series, wherein each of the first shunt element and the second shunt element has a low impedance with respect to a resistance value of the negative differential resistance element used as a reference.

2. The antenna device according to claim 1, wherein expressions (1) to (3) below are satisfied:

$$Rp+1/(2\pi\times f\times Cp)<r \tag{1}$$

$$Rc+1/(2\pi\times f\times Cc)<r \tag{2}$$

$$L/(Cc\times r)<Rc \tag{3}$$

where r is an absolute value of the resistance value of the negative differential resistance element, Rp is a resistance value of the second resistor, Cp is a capacitance value of the second capacitor, Rc is a resistance value of the first resistor, Cc is a capacitance value of the first capacitor, L is an inductance of a path connecting the first shunt element and the second shunt element, and f is a frequency less than a resonance frequency of the resonance circuit.

3. The antenna device according to claim 1, wherein the inductance L of the path connecting the first shunt element and the second shunt element satisfies an expression (4) below:

$$L\leq 5\text{ nH} \tag{4}$$

wherein, in a case where the path is divided into a first portion in which a cross section of the path can be approximated to a circular shape and a second portion in which the cross section of the path can be approximated to a quadrilateral shape, an inductance L1 of the first portion is calculated according to an expression (5) below, while an inductance L2 of the second portion is calculated according to an expression (6) below:

$$L1=0.2\times l1\times[\ln(4\times l1/d)-0.75] \tag{5}$$

$$L2=0.2\times l2\times[\ln\{2\times l2/(w+h)\}+0.2235]\times(w+h)/l2+0.5] \tag{6}$$

where l1 is a length of the first portion, d is a diameter of a cross section of the first portion, l2 is a length of the second portion, w is a width of the second portion, and h is a thickness of the second portion.

4. The antenna device according to claim 1, wherein a plurality of pairs of the first shunt elements and the second shunt elements are arranged, and wherein at least two of the pairs of the first shunt elements and the second shunt elements are placed at positions symmetrical to each other with respect to an axis passing through a center of the antenna array.

5. The antenna device according to claim 4, wherein the two pairs of the first shunt elements and the second shunt elements are arranged such that the antenna array is interposed between the two pairs of the first shunt elements and the second shunt elements.

6. The antenna device according to claim 4, wherein the first shunt elements are arranged on a chip on which the antenna array is to be placed, wherein the chip is a chip having a quadrilateral shape, and wherein the second shunt elements included in the respective pairs of the first shunt elements and the second shunt elements are arranged in the vicinities of corners of the chip.

7. The antenna device according to claim 4, wherein the second shunt elements included in the two respective pairs of the first shunt elements and the second shunt elements are connected in parallel.

8. The antenna device according to claim 1,
wherein the first shunt element is placed on the chip on which the antenna array is to be placed, and
wherein the second shunt element is placed on a substrate on which the chip is to be placed.

9. The antenna device according to claim 8,
wherein the path connecting the first shunt element and the second shunt element includes a first pad placed on the chip and a second pad placed on the substrate, and
wherein a bias voltage is supplied to the antenna array via each of the first pad and the second pad.

10. The antenna device according to claim 9, further comprising:
a third pad placed on the chip and a fourth pad placed on the substrate,
wherein a ground voltage is supplied to the antenna array via each of the third pad and the fourth pad,
wherein the chip is a chip having a quadrilateral shape,
wherein the bias voltage is supplied from a side of the chip, on which a first side thereof is present, to the antenna array via each of the first pad and the second pad, and
wherein the ground voltage is supplied from a side of the chip, on which a second side thereof different from the first side is present, to the antenna array via each of the third pad and the fourth pad.

11. The antenna device according to claim 9,
wherein the first pad and the second pad are connected using a plurality of bonding wires connected in parallel.

12. The antenna device according to claim 8,
wherein the second resistor is wiring placed in the substrate.

13. The antenna device according to claim 1,
wherein a combined resistance value of the negative differential resistance elements in the antenna array is not more than 1 Ω.

14. The antenna device according to claim 1,
wherein a length of the path connecting the first shunt element and the second shunt element is not more than 4 mm.

15. The antenna device according to claim 14,
wherein the length of the path connecting the first shunt element and the second shunt element is not more than 2 mm.

16. The antenna device according to claim 1,
wherein a frequency band of the electromagnetic wave includes at least a part of a frequency band of at least 30 GHz and not more than 30 THz.

17. The antenna device according to claim 1,
wherein the negative differential resistance element is a resonant tunneling diode.

18. The antenna device according to claim 1,
wherein the first capacitor is a MIM (Metal-Insulator-Metal) capacitor.

19. The antenna device according to claim 1, further comprising:
a third shunt element connected in parallel to the negative differential resistance element in the antenna array and including at least a third capacitor.

20. The antenna device according to claim 19,
wherein a plurality of the third shunt elements are arranged between the antenna and the antenna.

21. The antenna device according to claim 20,
wherein each of the third shunt elements is shared between the two antennas each adjacent to the third shunt element.

22. The antenna device according to claim 19,
wherein respective areas or capacitance values of the third capacitor, the first capacitor, and the second capacitor are progressively larger in this order.

23. The antenna device according to claim 19,
wherein the number of the third shunt elements is the number of the first shunt elements or more and the number of the second shunt elements or more.

24. The antenna device according to claim 19,
wherein the number of the third shunt elements is less than the number of the first shunt elements and less than the number of the second shunt elements.

25. The antenna device according to claim 1,
wherein the number of the second shunt elements is the number of the first shunt elements or more.

26. The antenna device according to claim 1,
wherein the number of the second shunt elements is less than the number of the first shunt elements.

27. An antenna device transmitting or receiving an electromagnetic wave, the antenna device comprising:
a chip having an antenna array in which a plurality of antennas each including a negative differential resistance element and a resonance circuit are arranged;
a substrate on which the chip is to be placed; and
a voltage bias circuit that applies a voltage to the antenna array, wherein
the chip has:
a first shunt element connected in parallel to each of the negative differential resistance element and the voltage bias circuit and including at least a first capacitor; and
a plurality of pads including at least each of a first pad and a second pad to supply a predetermined voltage to the antenna array,
the substrate has:
a second shunt element connected in parallel to each of the negative differential resistance element and the voltage bias circuit, and including at least a second capacitor, and moreover placed in the substrate, and wherein
the antenna array is located between the first pad and the second pad.

28. The antenna device according to claim 27, further comprising:
a third shunt element connected in parallel to the negative differential resistance element in the antenna array and including at least a third capacitor.

29. A camera system comprising:
the antenna device according to claim 1;
a detection device for detecting the electromagnetic wave transmitted from the antenna device; and
a processing unit that processes a signal from the detection device.

30. A camera system comprising:
the antenna device according to claim 27;
a detection device for detecting the electromagnetic wave transmitted from the antenna device; and
a processing unit that processes a signal from the detection device.

* * * * *